(12) United States Patent
Bradley et al.

(10) Patent No.: US 8,483,965 B2
(45) Date of Patent: Jul. 9, 2013

(54) METHOD AND APPARATUS FOR DETECTION OF HYDROCARBON DEPOSITS

(75) Inventors: Ken Bradley, Calgary (CA); Russ Duncan, Calgary (CA); Aaron Balasch, Calgary (CA)

(73) Assignee: Sky Hunter Corporation, Calgary (CA)

( * ) Notice: Subject to any disclaimer, the term of this patent is extended or adjusted under 35 U.S.C. 154(b) by 380 days.

(21) Appl. No.: 12/886,402

(22) Filed: Sep. 20, 2010

(65) Prior Publication Data

US 2011/0137568 A1 Jun. 9, 2011

(30) Foreign Application Priority Data

Dec. 7, 2009 (CA) ..................................... 2688048

(51) Int. Cl.
*G01V 1/40* (2006.01)
*G01V 3/18* (2006.01)

(52) U.S. Cl.
USPC .......................... 702/13; 702/1; 702/2; 702/5

(58) Field of Classification Search
USPC ............... 702/1, 2, 5; 382/284; 342/191, 351, 342/357.17; 348/116; 73/178 R; 701/200, 701/213, 214, 220, 223; 324/330, 331
See application file for complete search history.

(56) References Cited

U.S. PATENT DOCUMENTS

| | | | |
|---|---|---|---|
| 4,338,029 A | 7/1982 | Macourt | |
| 7,222,020 B2 * | 5/2007 | Knight et al. | ..................... 702/2 |
| 7,542,850 B2 * | 6/2009 | Humphrey et al. | ............... 702/2 |
| 2005/0017721 A1 * | 1/2005 | McCracken et al. | .......... 324/330 |

FOREIGN PATENT DOCUMENTS

CA    2636180    12/2008

OTHER PUBLICATIONS

Knowledge-based remote sensing of complex objects: recognition of spectral and spatial patterns resulting from natural hydrocarbon seepages; Harald Michael Arnout Van der Werff; Utrecht, Nederland, 1975.

* cited by examiner

*Primary Examiner* — Sujoy Kundu
(74) *Attorney, Agent, or Firm* — Sean W Goodwin

(57) ABSTRACT

A method and apparatus is provided for detecting and categorizing subsurface hydrocarbon reservoirs. Air samples are collected and analyzed by counting hydrocarbon ions, such as methane ions and counting at least one higher order hydrocarbon ions, such as propane, pentane or hexane. The methane ions and at least one higher order hydrocarbon ions are associated with location co-ordinates to form a first raw data set and second raw data set. The first and second raw data sets are analyzed and processed to produce hydrocarbon footprints. The hydrocarbon footprints are superpositioned with other available geological information and subsurface formations of interest are identified.

27 Claims, 23 Drawing Sheets

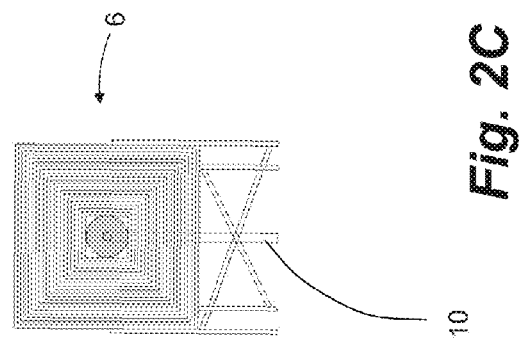
Fig. 2C
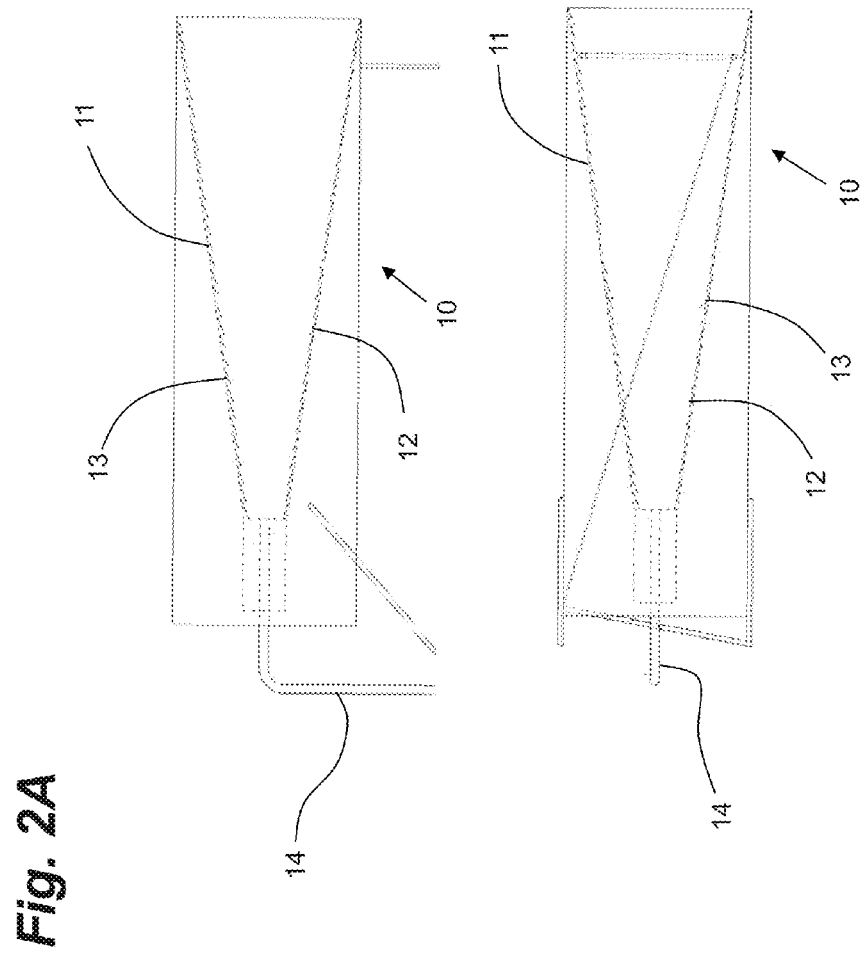
Fig. 2A
Fig. 2B

METHOD AND APPARATUS FOR DETECTION OF HYDROCARBON DEPOSITS

FIELD OF THE INVENTION

This invention relates to apparatus and methodologies for detection and characterization of hydrocarbon microseeps in the assessment of hydrocarbon deposits. More particularly the invention relates to detection of methane ions and higher order hydrocarbon ions and establishing hydrocarbon intensity footprints representing hydrocarbon deposits for superposition over geological features.

BACKGROUND OF THE INVENTION

It is known to identify subsurface hydrocarbon reservoirs like hydrocarbon reservoirs by the detection and analyzing of microseeps. Microseeps are defined as leakage of hydrocarbons from subsurface reservoirs to the surface and into the atmosphere. Various different methods are known for detection and analysis of microseeps.

U.S. Pat. No. 4,338,029 to Macourt relates to a method of hydrocarbon exploration wherein air samples are collected while traversing an area by aircraft. Air samples are collected using an air intake, a focusing tube or an aerodyne tube mounted on an aircraft. The air samples are subjected to spectroscopic analysis to determine the extent of halogens and hydrocarbons present in the air samples. The spectrometer is coupled to a navigating system so that the output of the spectrometer can be correlated with the position of the aircraft over the ground. Macourt provides an overall count of the hydrocarbons present in the collected air samples but does not assist in the characterization of the results for the identification of a commercially viable subsurface reservoir.

U.S. Pat. No. 7,542,850 to Humphrey et al. relates to methods for processing geophysical survey data which is collected during aerial exploration of hydrocarbon deposits or ore bodies. More particularly the invention relates to a method for synchronizing data recorded from one or more sensors. The method comprises receiving a first and second geophysical data from a first and second sensor. The geophysical data collected by the two sensors are associated with position and time data to get two sets of merged data. Further, errors can be detected by comparing the merged data.

CA 2,636,180 to Breukelman et al. relates to method for locating and differentiating areas with high shale content from areas of low shale content using gravity gradient measurements. The gravity gradiometer instrument is located in an aircraft which flies in a selected pattern over the terrain to be surveyed and measures one or more components or combinations of components of the gravitational gradient at a plurality of points on said terrain. The measurements are recorded and analyzed to determine and mark deposits large enough to exploit economically.

What is still required in the prior art is to be able to better detect and characterize microseep information for the investigation and differentiation of subsurface formations of interest from the predominant background level of microseep data.

SUMMARY OF THE INVENTION

Herein, embodiments of the invention are directed to the detection of microseeps from subsurface formations/reservoirs and methods for distinguishing (categorization) subsurface formations or reservoirs of interest, being those most likely amenable to commercial exploitation. Further, embodiments of the apparatus and methodologies of the present invention enable determination whether the subsurface formation is a source of dry gas or oil (rich gas) and also to predict the potential of the subsurface formation for commercial exploitation.

In embodiments of the invention, apparatus establishes the amount or intensity of methane, or, methane and an amount or intensity of at least one higher order hydrocarbon present in the collected air samples. Accordingly, one can establish the general nature of the subsurface formation. Further, the hydrocarbon and spatial data are combined to establish one or more sets of hydrocarbon intensity footprints of hydrocarbon deposits for alignment with and superposition over geological features. Hydrocarbon intensities can be associated with a geological map of the subsurface formations formed below the surveyed terrain so that one can readily determine the size, shape and orientation of the subsurface formations and whether the detected subsurface formations can potentially be exploited industrially.

Accordingly in one broad aspect of the present invention a method of detecting and categorizing subsurface hydrocarbon reservoirs comprises traversing a plurality of flight lines over terrain to be surveyed for establishing a two-dimensional grid over the terrain which corresponds to the subsurface formations therebelow. Air samples are collected along the flight lines. Hydrocarbon ions present in the collected air samples for each of a plurality of location co-ordinates along the flight lines are counted for establishing at least one raw data set of the hydrocarbon ion count at each of the plurality of location co-ordinates. The hydrocarbon ions counted are methane ions and/or at least one higher order hydrocarbon ions. Amplitude anomalies from the at least one raw data set are isolated for establishing at least a first residual data set of data points. Each data point of the residual data set is indicative of the hydrocarbon intensity at each of the plurality of location co-ordinates in the two-dimensional grid. The at least first residual data set is mapped on the two-dimensional grid. A first-threshold hydrocarbon intensity of interest is established. Data points relatably adjacent one another within the two-dimensional grid and having intensities equal to the first-threshold hydrocarbon intensity are identified. Such equal-intensity data points are associated to form at least a first, first-threshold footprint which encompasses the equal-intensity data points and any greater-intensity data points having intensities greater than the first-threshold hydrocarbon intensity. The at least a first, first-threshold footprint is superimposed over a geological map of the subsurface formation within the terrain surveyed to readily identify at least the location, size and shape of the terrain corresponding to the subsurface formation of interest.

Accordingly in another broad aspect of the present invention an apparatus for detecting and categorizing hydrocarbon deposits in subsurface formations comprises an aircraft with a scoop fitted thereon for traversing a plurality of flight lines over terrain to be surveyed for establishing a two-dimensional grid over the terrain which corresponds to the subsurface formations therebelow. The scoop collects air samples and focuses the ions contained in the air samples towards a detector array. The detector array comprises at least one detector for counting hydrocarbon ions present in the collected air samples for each of a plurality of location co-ordinates along the flight lines for establishing at least one raw data set of the hydrocarbon ion count at each of the plurality of location co-ordinates. The hydrocarbon ions counted are methane ions and/or at least one higher order hydrocarbon ions. The apparatus further comprises at least one processing unit for receiving and analyzing the at least one raw data set for creating footprints of interest indicative of the hydrocarbon intensities contained in the collected air samples and superimposing the footprints over a geological map of the subsurface formation within the terrain surveyed to readily identify at least the location, size and shape of the terrain corresponding to the subsurface formation of interest.

BRIEF DESCRIPTION OF THE DRAWINGS

FIGS. 2A, 2B and 2C are various views of the electromagnetic focusing tube according to an embodiment of the invention;

FIG. 8C is a subset of FIG. 8A along line AA;

DETAILED DESCRIPTION OF THE PREFERRED EMBODIMENTS

According to an embodiment of the invention an aerial survey is conducted by traversing a terrain potentially containing subsurface formations/reservoirs of commercially exploitable hydrocarbon reserves. Survey data is collected for indexing with the microseep data.

Figure 1:
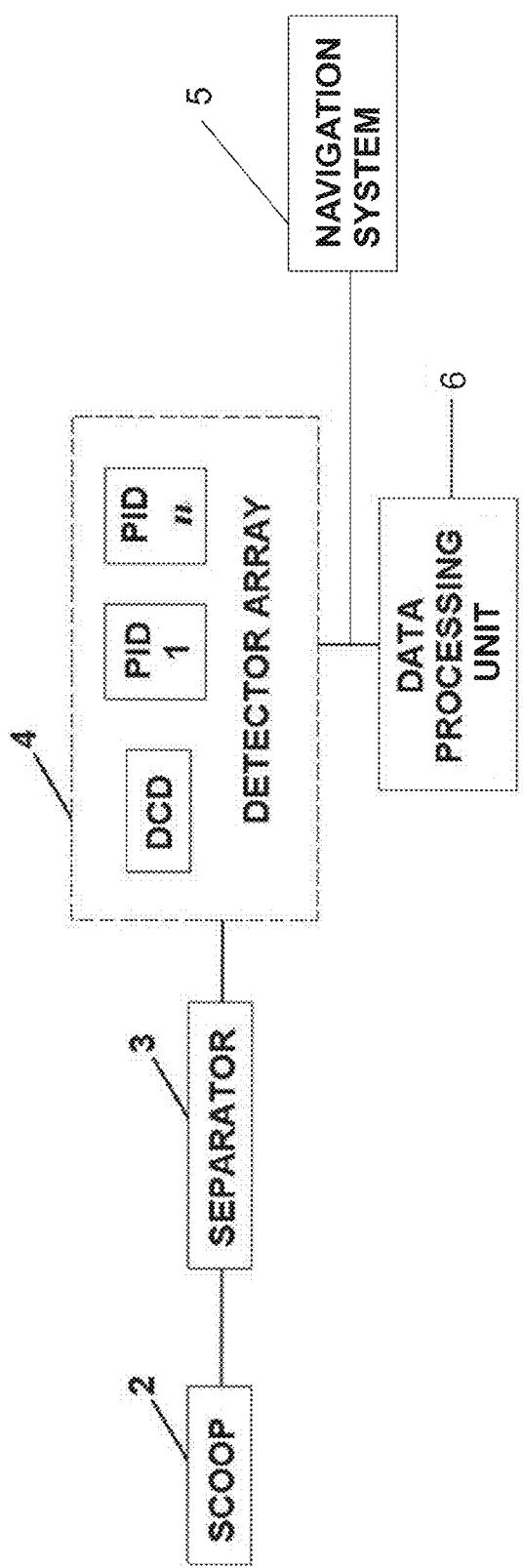
FIG. 1 is a block diagram of the microseep detection apparatus of the invention according to an embodiment of the invention.

Having reference to FIG. 1, an aircraft (not shown) is fitted with a microseep detection apparatus 1 comprising a scoop 2, a contaminant separator 3, a detector array 4, a navigation system 5 and at least one data processing unit 6 for processing and analyzing data. The data processing unit is located in the aircraft or at a remote location.

The air scoop is positioned on the aircraft so as to minimize contamination. For example, mounting of the scoop ahead of the aircraft engines avoids exhaust, unburned fuel and other hydrocarbon contaminants. In the case of a twin engine, low wing aircraft such as a Piper Navajo the scoop is located on the top of the fuselage of the aircraft. In order to avoid air turbulence at the face of the scoop the scoop is preferably positioned within the area of a smooth slipstream such as the fuselage. Use of an aircraft with a rear-mounted engine minimizes any concern for contamination.

With reference to FIG. 2, a form of scoop 2 is an electromagnetic focusing tube 10. The tube 10 comprises a pyramidal scoop having converging walls 11 and 12. Each wall is formed of overlapping louvers 13 for focusing the charged ions of the air samples towards a collection tube 14 at downstream apex, while permitting the majority of the air to be vented or discharged laterally through the louvers 13. The louvers 12 are angled and overlapping so as form a continuous and focused ion path, yet causing a tortuous path for venting of the air and forming a concentrated air sample. The collection tube 14 is connected to the detector array 4 of FIG. 1.

For removal of foreign particulates including dust and insects the concentrated air sample can be directed through the separator 3. An example of such a separator 3 is a centrifugal separator which uses centrifugal forces to trap the particulate matter. A centrifugal separator comprises a coiled tube which directs the air sample in a circular path and one or more tangential traps are provided along the coiled tube to capture the particulates.

The concentrated air sample is transferred to the detector array 4 for detection of hydrocarbons.

According to an embodiment of the invention the detector array 4 detects at least two distinct bands (channels) of hydrocarbons contained in the air samples. A first, direct current discharge spectral emission type detector (DCD) detects the total number of hydrocarbon ions, the bulk of which are methane ions. Suitable detectors for the higher order hydrocarbon bands can include one or more second sensors such as photoionization detectors (PID). Further, other detectors can be added for carbon dioxide, iodine, or any other indicative component. Such detectors may be a DCD or a PID or other forms of detectors.

Measurements of the monitored hydrocarbon levels by each detector are qualitative in nature, rather than quantitative, in that the actual concentration of hydrocarbons in each band is not directly determinable. A resultant spectrum of hydrocarbons is arrived at by further analysis of the hydrocarbon levels measured. The resultant spectrum is indicative of microseeps emanating from subsurface pressurized oil or gas reservoirs.

The first detector (DCD) monitors total hydrocarbon ions (a first channel or band) ranging from the lightest compound, methane (C1), to the more complex (higher order) hydrocarbon chains such as ethane (C2), propane (C3), butane (C4), pentane (C5), and heavier hydrocarbons. Because of the overwhelmingly large concentrations of methane compared to the ever-decreasing relative concentrations of the heavier hydrocarbons in a given air sample, this first detector is substantially a methane, or dry gas detector. As such, methane gas reservoirs can be isolated in the microseep mapping process from oil reservoirs and potentially from "wet" gas or liquids-rich gas reservoirs. The oil and rich gas reservoirs will also have associated methane microseeps emanating therefrom because methane is ever-present in oil and rich gas pools.

Applicant believes that the corollary is not necessarily true. In the case of dry gas or pure methane gas pools sourced from biogenic environments, the methane is a byproduct of bacterial interaction and decay of organic matter which is not thermogenically derived. The biogenic methane gas produced is not the result of a combined high overburden pressure and high temperature source environment. Swamp or bog gas, animal feedlot and landfill/garbage dump gas is also pure methane with a biogenic source. Therefore, if a methane microseep footprint is known to be biogenic in nature, this provides evidence that any coincident oil (rich gas) footprint likely originates from a different subsurface source.

Applicant understands that coal bed methane, or coal seam gas, may be dry (pure) methane, but some coal seams are actually the source beds for thermally generated complex hydrocarbons. Much of the large but shallow gas reserves in the Upper Cretaceous stratigraphic sequences in North America are of a biogenic origin, and therefore it is convenient and useful to be able to detect, measure and ultimately map these dry gas reservoirs as potential exploration targets. Because the composition of biogenic gas is pure methane, the gas exhibits the lowest heating/energy value of all the hydrocarbon compounds. Biogenic methane is considered to be "immature" gas. A second important source of pure methane, or dry gas, comes from "over-mature" environments where the geological thermal regime has gotten progressively more intense, post-hydrocarbon generation, from a combined pressure and temperature perspective. The oil and gas originally expelled from source rocks becomes thermally degraded as the volatile hydrocarbons are driven off by "cooking" the mature petroleum into an over-mature state, that results in all hydrocarbons other than methane being expelled from the reservoir, with dry gas (methane) being the only remaining hydrocarbon left to produce microseeps into the atmosphere.

The first "total hydrocarbon" detector detects this over-mature methane. "Cooked" gas reservoirs exist in geological basins worldwide, and are usually associated with deep, high pressure settings in compressional regimes. Both sandstone and carbonate reservoirs can house "cooked" methane gas pools, but the Devonian reefal carbonates of west-central Alberta can have gas reservoirs containing only methane and hydrogen sulphide (H2S) in various proportions.

A third class of dry methane exists in the form of frozen gas hydrates normally found in deep offshore continental shelf environments. These potentially commercial methane gas pockets are the subject of many large research projects being conducted internationally. Like permafrost, hydrates are made up of methane in association with ice crystals. Dry gas microseep mapping of gas hydrates may hold significant promise for the future exploration for new unconventional methane gas reserves in the future.

The one or more second detectors (PID) monitor a second channel of higher order hydrocarbon ions including propane (C3) and heavier hydrocarbons such as butane (C4), pentane (C5), hexane (C6) and heavier. It is important to note that methane (C1) and ethane (C2) are not substantially detected along with the heavier hydrocarbon bands, therefore the heavier hydrocarbon suites preclude any significant "dry" gas (methane) readings. The one or more second detectors measure the concentration of C3 and heavier hydrocarbons, including condensate, which is a prevalent component I liquids-rich natural gas streams. This results in biogenic and "cooked" natural gas content being effectively invisible to this detector, and by process of elimination, all monitored hydrocarbons must be in the liquids-rich gas or oil window. By definition, all of these hydrocarbons must have been thermally generated within kitchen-based source beds within one or more petroleum systems of a mature sedimentary basin.

A third detector of the one or more second detectors, a higher order hydrocarbon detector (PID), can be directed for sensing a third channel of heavier components of any higher order hydrocarbons including pentane (C5), also known as condensate, and heavier, more complex hydrocarbons. This third channel of microseep information is used in collaboration with the second channel of the second detector which measures concentrations of propane (C3) and heavier. Because pentane is heavier than propane it is expected that propane ion counts in a given microseep sample would exceed the pentane ions counts in the same sample. Therefore, there is a tendency to bias the propane and heavier (C3+) spectrum slightly over the pentane and heavier (C5+) readings. The combination of both these second and third channels gives stronger evidence of hydrocarbon accumulation than viewing either one of these channels in isolation.

Collection of Air Samples, Analysis of Data and Superposition

Figure 3:
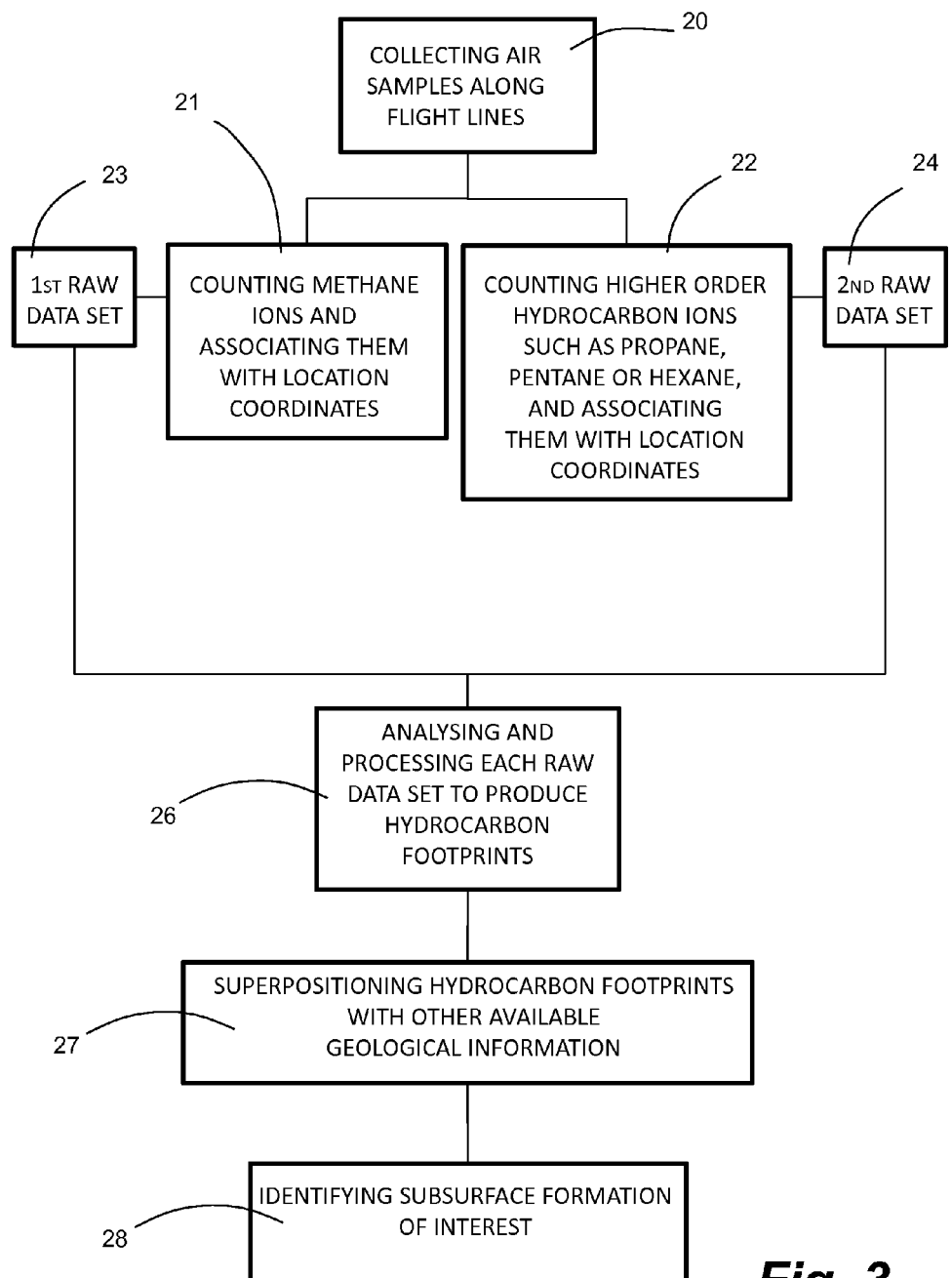
FIG. 3 is a flowchart illustrating the method of the invention according to an embodiment of the invention.
Figure 4:
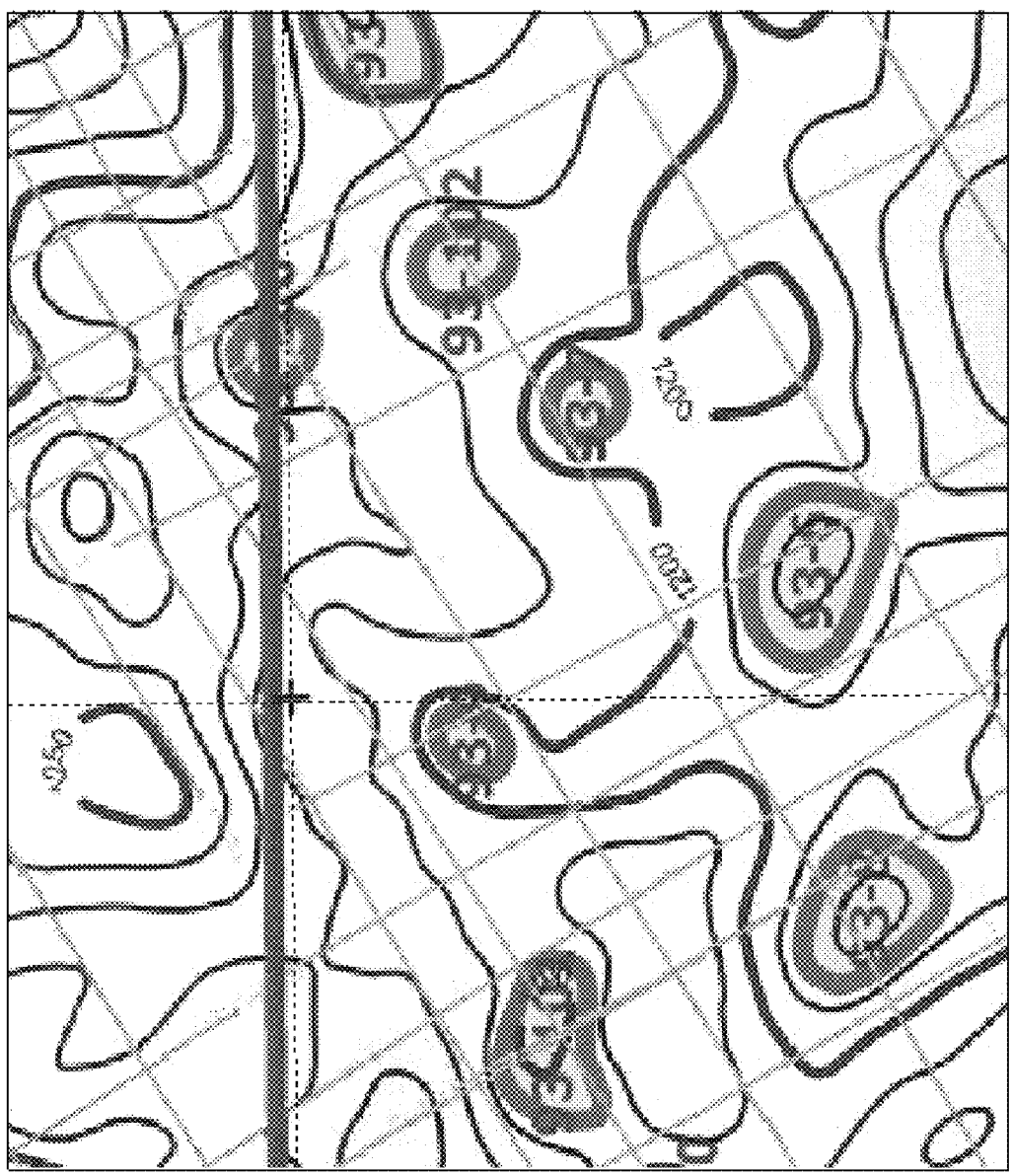
FIG. 4 is a section of the geological map of a subsurface formation which was within the area surveyed as an example of the invention.
Figure 6A:
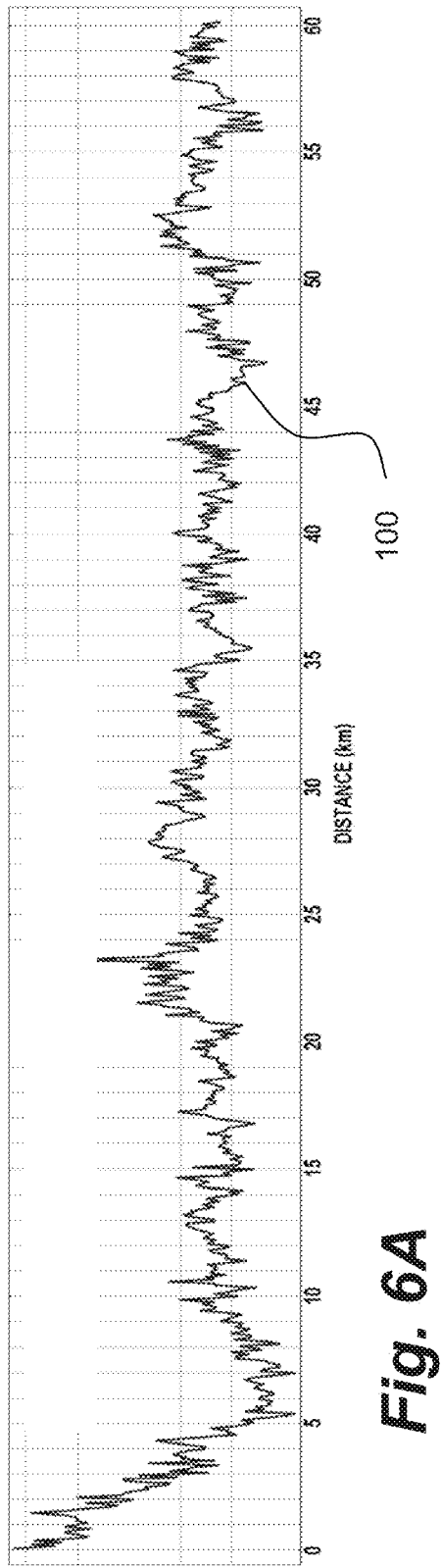
FIGS. 6A through 6F are schematic representations of the steps involved in the analysis (isolation of residual amplitude anomalies) of the raw data set corresponding to the methane ions detected in the collected air samples for one flight line according to an example of the invention.
Figure 7A:
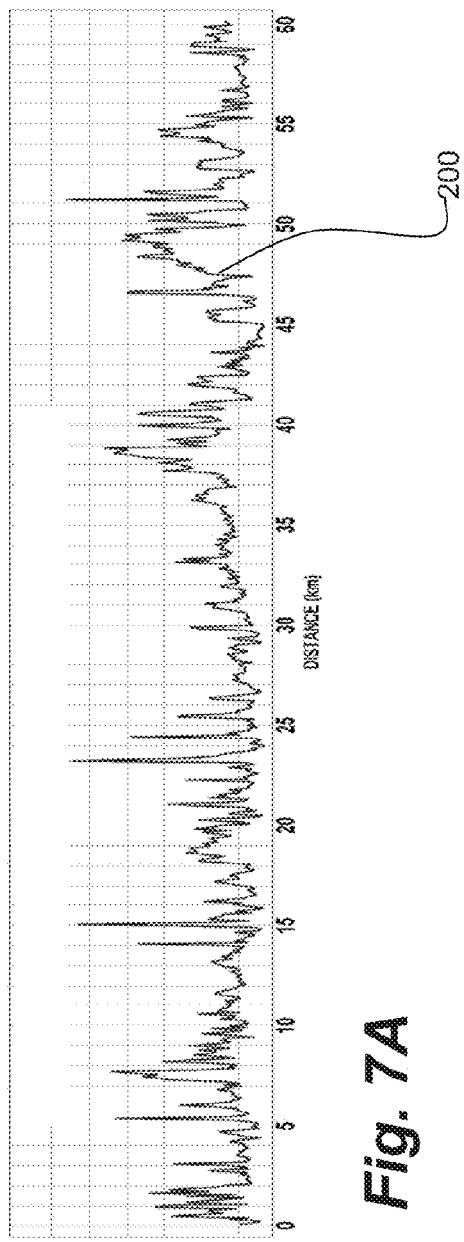
FIG. 7A through 7F are schematic representations of the steps involved in the analysis (isolation of residual amplitude anomalies) of the raw data set corresponding to one of the higher order hydrocarbon ions detected (propane is detected in the example) in the collected air samples for one flight line according to an example of the invention.

With reference to FIG. 3 a method of detecting and categorizing subsurface hydrocarbon reservoirs comprises collecting air samples (block 20), counting hydrocarbon ions, such as methane ions (block 21) and counting at least one higher order hydrocarbon ions, such as propane, pentane or hexane (block 22). The methane ions and at least one higher order hydrocarbon ions are associated with location co-ordinates to form a first raw data set and second raw data set (FIGS. 6A, 7A and blocks 23 and 24). The first and second raw data sets are analyzed and processed to produce hydrocarbon footprints (block 26). The hydrocarbon footprints are superpositioned with other available geological information (block 27) and subsurface formations of interest are identified (block 28).

Figure 5A:
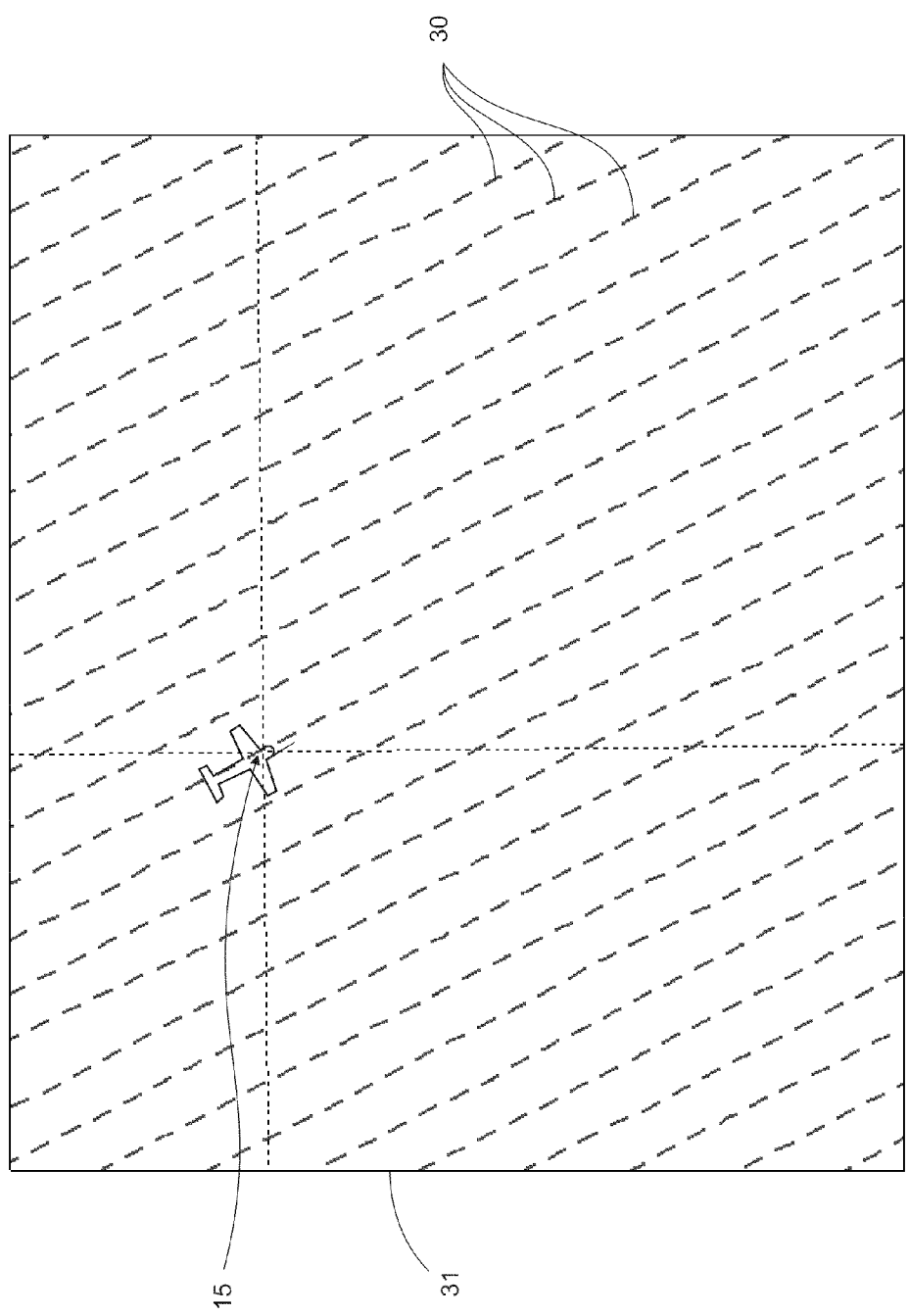
FIG. 5A is a section of the survey flight plan showing the flight lines according to an example of the invention.
Figure 5B:
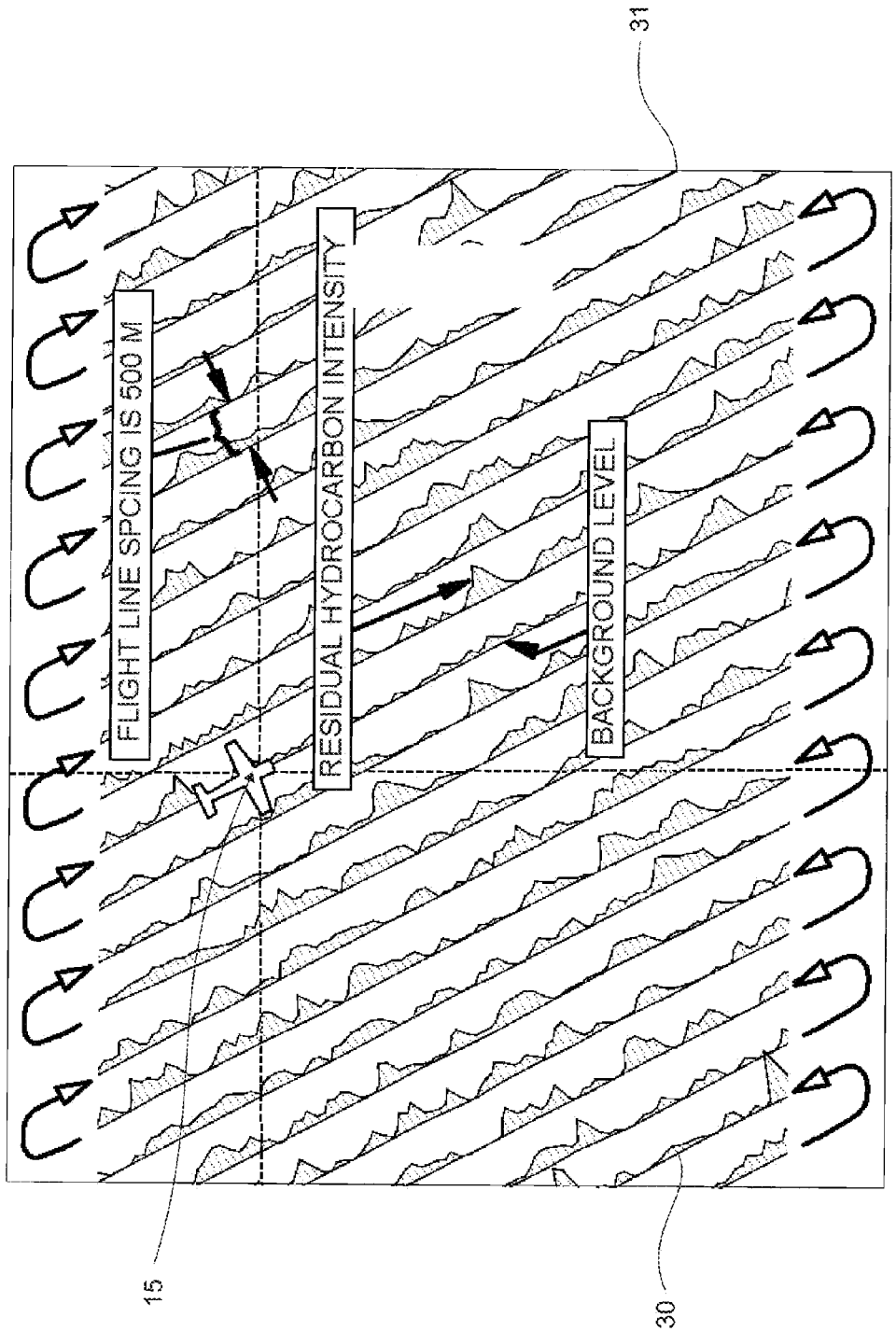
FIG. 5B is a representation of the flight lines with the methane and higher order hydrocarbon (propane is detected in the example) residual data sets mapped on each flight line according to an example of the invention.

With reference to FIGS. 5A and 5B an aircraft 15 is fitted with the scoop 2 is flown (traversed) over the terrain to be surveyed along flight lines. The flight lines marked 30 establish a two-dimensional grid marked 31 over the terrain to be surveyed. Along a given flight line, discrete "snapshot" samples (microseep readings) are digitally recorded once per second (sample point). Given a groundspeed of the aircraft of 288 km/hr, this sampling frequency equates to 80 meter spacing between sample points along the flight lines. The spacing between two adjacent flight lines is in the range of about 0.5 kilometer to about 1 kilometer. Preferably, the maximum spacing between two adjacent flight lines is 1 kilometer, although decreasing the spacing between adjacent flight lines reduces aliasing and increases the reliability of the gridded data surface when the data is mapped.

The total number of hydrocarbon ions detected in the collected air samples for each snapshot along a flight line by the first detector (DCD) (which are essentially methane ions) is associated with location co-ordinates to form a first raw data set 100 (FIG. 6A). The higher order hydrocarbon ions detected in the collected air samples by the second detector (PID) for each snapshot along a flight line is associated with location co-ordinates to form a second raw data set 200 (FIG. 7A).

FIGS. 6A through 6F illustrate the various steps involved in the analysis of the first raw data set relating to methane ions. FIGS. 7A through 7F illustrate the various steps involved in the analysis of second raw data relating to the heavier (higher order) hydrocarbon ions detected.

Figure 6B:
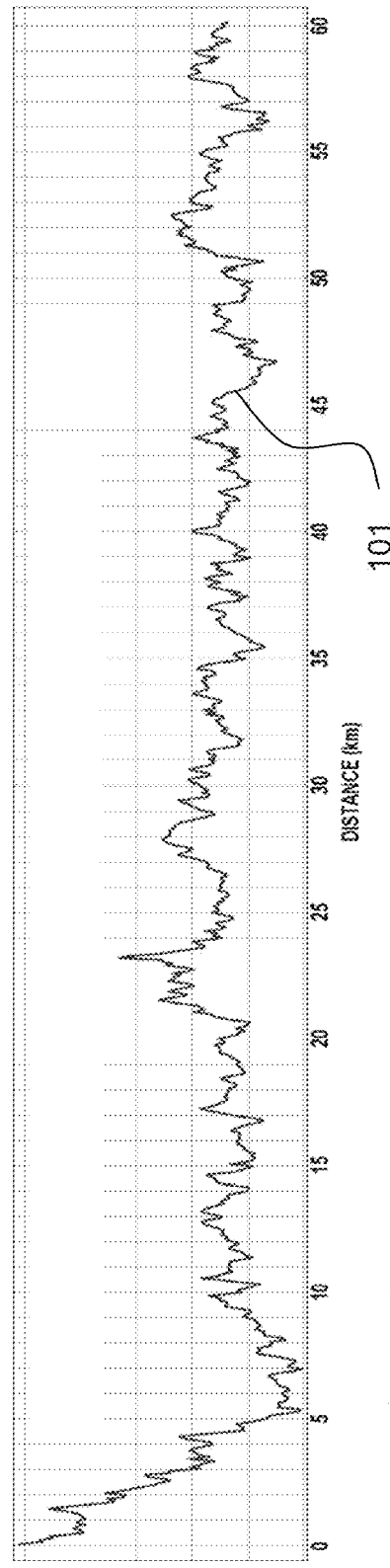
Figure 7B:
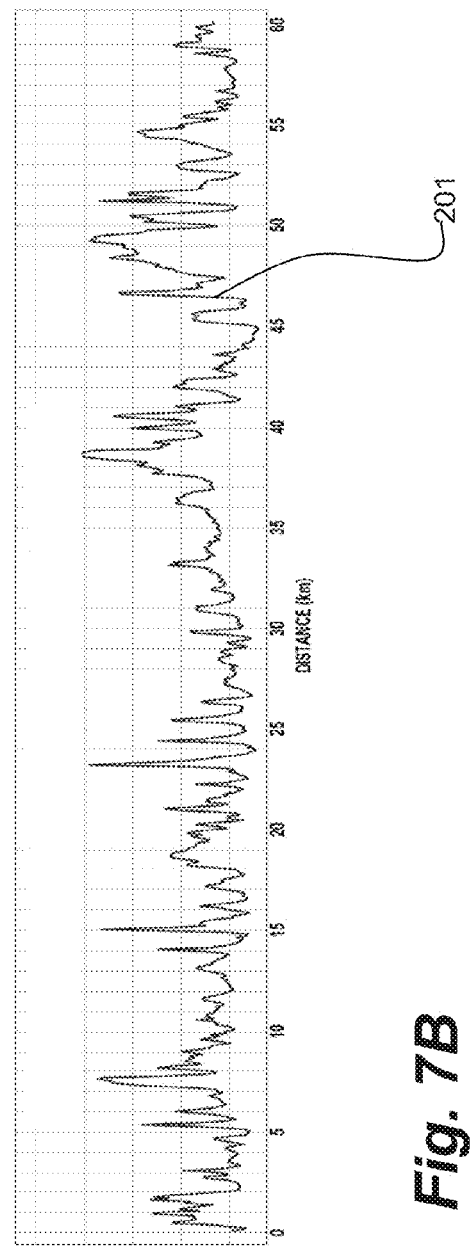

Each microseep reading (snapshot) is referred to as a fiducial. With reference to FIGS. 6B and 7B, the start fiducial of each of the first and second raw data sets for each flight line is shifted by a specified lag. The need to shift the fiducial is due to the physical transit time from receipt of the air sample entering the scoop to receipt of the air sample at the detector array where the hydrocarbon ions are detected and recorded along with the positional information. The actual position of the microseep column is where the air sample enters the scoop as opposed to where the hydrocarbon ions are recorded. The lag time is the time taken for the hydrocarbon ions to travel from the scoop to where the hydrocarbon ions are recorded.

With reference to FIGS. 6B and 7B, first and second resampled data sets 101 and 201, respectively are generated. The first and second raw data sets 100, 200 are resampled to account for the variable ground speed of the aircraft. Resampling of data is required after a lag correction. Resampling of data is done in order to convert the entire dataset from a constant sampling frequency in the time domain to a constant sampling frequency in the spatial domain. Resampling is also needed to mitigate aliasing effects when the data is mapped. The sampling rate at the detector is a constant one second in the time domain, but the distance on the ground that the aircraft travels in one second will differ depending on whether the aircraft is flying into a headwind or with a tailwind. Given a constant wind speed and a constant airspeed, the ground speed of the aircraft will be greater when flying with a tailwind than when flying into a headwind. In such a case, the true ground speed will be an average of the two groundspeeds since the tailwind increases the groundspeed of the aircraft by the same amount that the headwind slows down the groundspeed. If the average groundspeed of the aircraft is 80 meters per second, the data can be resampled to a frequency of 80 m/s in the time domain. The resampling rate (frequency) is not restricted to the average groundspeed of the aircraft. However, one way of calculating the resampling rate is by taking the average speed of the aircraft over several flight lines flown in opposite directions.

Figure 6C:
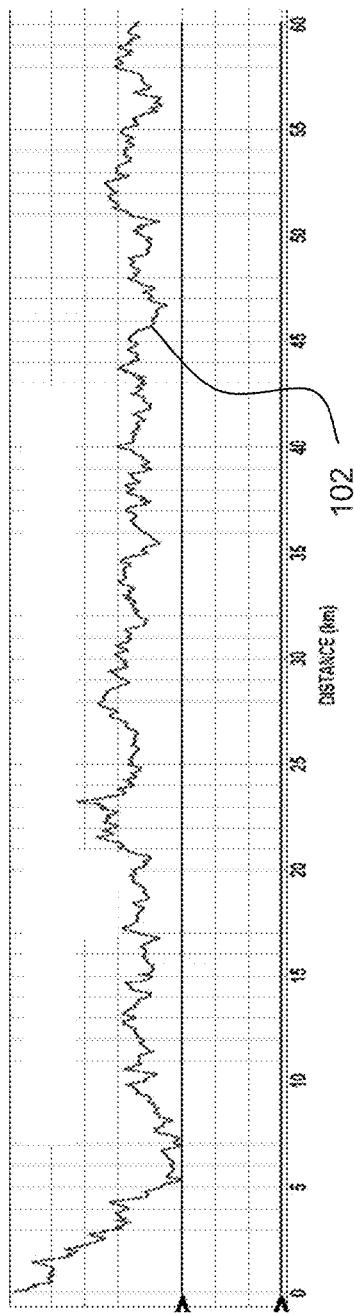
Figure 7C:
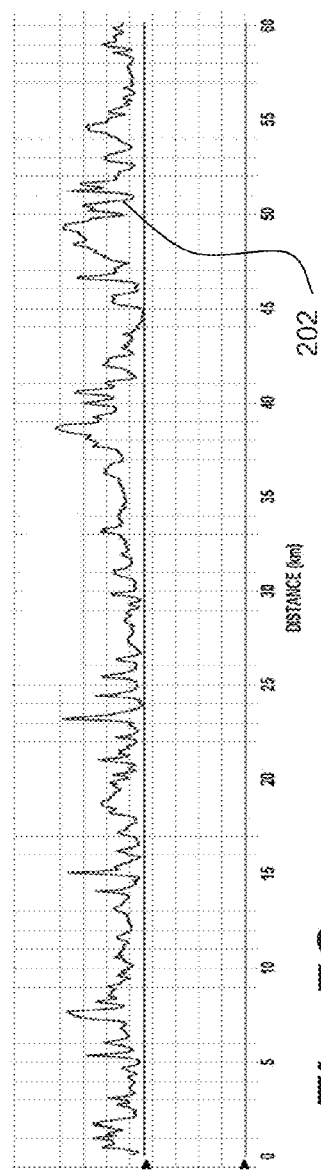

With reference to FIGS. 6C and 7C, the first and second resampled data sets 101, 201 are passed through one or more filters to remove noise and result in a first smoothed data set 102 (FIG. 6C) and second smoothed data set 202 (FIG. 7C). This is done by removing unwanted high amplitude and/or short wavelength data that display characteristics common to noise. This is achieved by convolving the original signal with any number or combination of linear or non-linear filters which may include low-pass, band-pass, weighted or simple averaging filters.

In choosing a suitable noise reduction method, the power spectra of Fourier transformed noise reduced signals and original signals can be looked at to help identify noise.

One way of achieving noise reduction is by convolving the data first with a weighted average convolution filter. As a second step, the data may be filtered again with an additional filter, such as a lowpass filter if further noise reduction is warranted.

The entire procedure of noise reduction is described as follows: A weighted averaging convolution filter is used alone or in combination with any lowpass or other standard filtering technique. A suitable weighted averaging filter is a 5 element weighted average convolution filter as given below:

0.056293459, 0.173396061, 0.540620958, 0.173396061, 0.056293459

The filter is based on a normal distribution with a standard deviation of 0.25. The five elements of the convolution filter are weighted corresponding to the normal probability density function which is given by the formula, $$PDF=1/(S*\mathrm{sqrt}(2*PI))*\exp[-((X-U)^2)/(2*S^2)]$$

where S is the standard deviation
U is the mean
X is the point at which the probability is to be calculated
PDF is the probability density function for the variable X
PI=3.1415

The probability density function equation for the normal distribution can be found in any reference known to the skilled person. A value of 0.25 for the standard deviation was chosen such that the resulting bell curve was sufficiently smooth yet still provided enough of a peak of distribution.

The five elements of the filter correspond to Z factors of 0, +/−0.5, and +/−1.0, where the Z factor is equal to the number of standard deviations from the peak of the distribution to where X lies. The variable X is related to the value of Z by the formula, $X=Z*S+U$. After the PDF values for each value of X was found, the cubed power of the PDF values were normalized so that the resulting 5 elements of the filter added up to 1.0.

After the above filter is applied to the smoothed data sets 102, 202, the smoothed data sets can be further smoothed by applying an additional lowpass filter to the data and then taking a weighted average of the outputs of the lowpass filter and the above Normal Distribution filter.

It should be understood that other methods of noise identification and removal or reduction may also be used. The Normal Distribution Filter described is only one example.

Figure 6D:
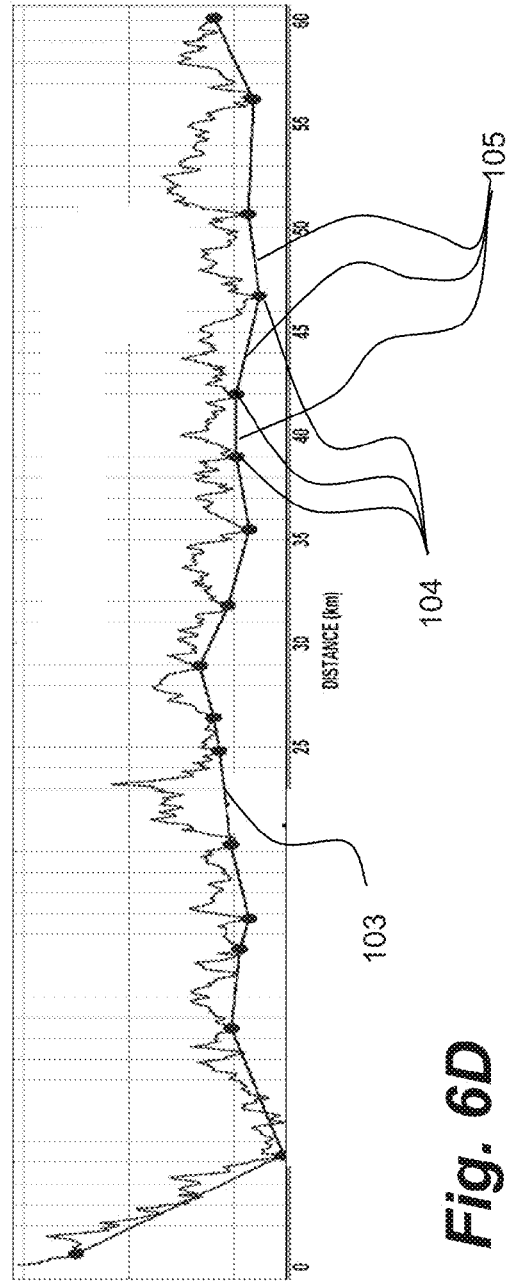
Figure 7D:
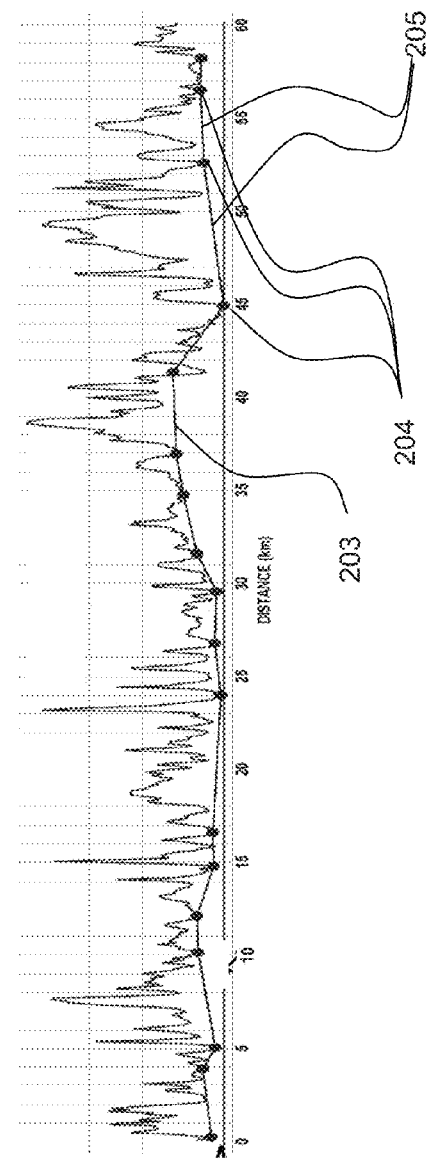

With reference to FIGS. 6D and 7D, a computer generated baseline 103, 203 is created for each of the two smoothed data sets 102, 202, respectively. This is done so as to locate and isolate residual amplitude anomalies. In the art of seismic analysis, and with reference to the Schlumberger Oilfield Glossary (www.glossary.oilfield.slb.com), the term "amplitude anomalies" is an abrupt increase in seismic amplitude that can indicate the presence of hydrocarbons, although such anomalies can also result from processing problems, geometric or velocity focusing or changes in lithology. Such amplitude anomalies can result from changes in acoustic impedance, such as when a gas sand underlies a shale.

Herein, in the context of microseep, the computer generated baseline 103, 203 consists of a series of vertices 104, 204 (which separate individual amplitude anomalies in the residual data sets) connected by straight line segments 105, 205 so that vertices 104, 204 may be deleted or added in order to refine the baseline 103, 203 in a subsequent manual baselining step. In its simplest form, baselining can consist of applying low order trend lines or other curves to the data. To generate a baseline, the baselining algorithm makes use of non-linear and linear filtering techniques in addition to other convolution filters that may shift the data either backwards or forwards by a given number of fiducials, take arithmetic and/or weighted averages, wavelet analysis of the data, including Fourier transforms, application of trend lines to the data, or other known techniques in order to pick local minima that are to be used as vertices for the computer generated baseline.

A baselining algorithm for example begins with running a lowpass filter of 30 fiducials on the original (smoothed and noise reduced) signal, which will be referred to as "ORI". The resulting waveform (signal) after running the lowpass filter on the original data set is denoted by "LP". An algorithm to find the local minima of a signal is applied to both the "LP" and "ORI" signals, giving "LPMIN" and "ORIMIN", respectively. "LPMIN" and "ORIMIN" are not continuous signals; "LPMIN" and "ORIMIN" are defined only where a local minimum on "LP" or "ORI" occur, everywhere else the value of signal is undefined (i.e. they have no value). For each instance where "LPMIN" is defined (i.e. has a value) the nearest occurrence where "ORIMIN" is defined is used as a vertex in "BASE1", which is the first iteration of the computer generated baseline. A copy of "BASE1" is created and will be referred to as "BASE2". Each occurrence of "BASE1" is checked against the value of "ORI" at that same position (for the purposes of this explanation, this position will be referred to as fiducial#1). If the value of "BASE1" is greater than the value of "ORI" at fiducial#1, and there are no more instances of "BASE1" within 10 fiducials of fiducial#1, then "BASE2" is set to the value of "ORI" at fiducial#1. After every instance of "BASE1" has been checked against "ORI", "BASE2" is now the second iteration of the computer generated baseline. A copy of "BASE2" is created and will be referred to as "BASE3". Next, a rolling median with a moving window of 30 fiducials is applied to "ORIMIN" and the result put into "MED1". "BASE2" is subtracted from "MED1" to give "MED2". A constant variable, "TOL", is set to be equal to the value of the standard deviation of "MED2" multiplied by 1.2 added to the mean of "MED2". If "BASE3", at the $n^{th}$ fiducial is greater than the value of "TOL", then "BASE3" at the $n^{th}$ fiducial is set to "BASE2" at the $n^{th}$ fiducial plus an offset, where the offset is equal to "MED1" at the nth fiducial minus one third of the value of "MED2" at the $n^{th}$ fiducial. "BASE3" is now the third iteration for the computer generated baseline. Further iterations for the computer generated baseline may be created through additional filtering techniques but for the purposes of this explanation here, which is intended to illustrate a general process for creating the computer generated baseline, only three iteration of the baseline will be discussed. If it is determined that "BASE3" is to be used as the computer generated baseline, a copy of "BASE3" is created and will be denoted as "BASE4". "BASE4" is now interpolated between its vertices (so "BASE4" is now continuous over the entire length of the flight line and is subtracted from "ORI". The result of subtracting "BASE4" from "ORI" is the residual signal (residual data set) which shows the presence or the absence of an amplitude anomaly between any two baseline vertices.

It should be understood that other algorithms for baselining may also be used. The algorithm described above is only one example and is the algorithm currently used to generate the computer generated baseline 103, 203.

Figure 6E:
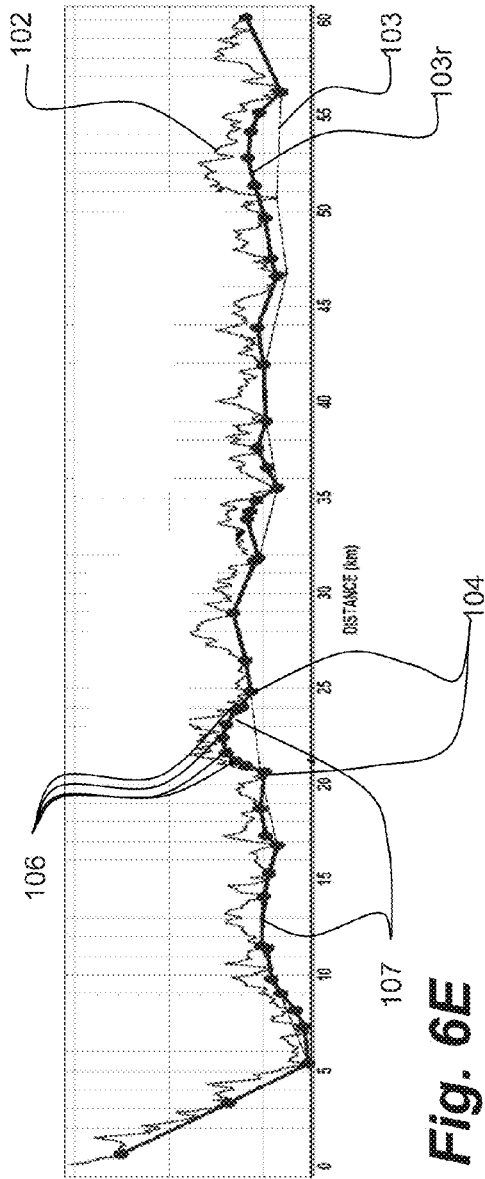
Figure 7E:
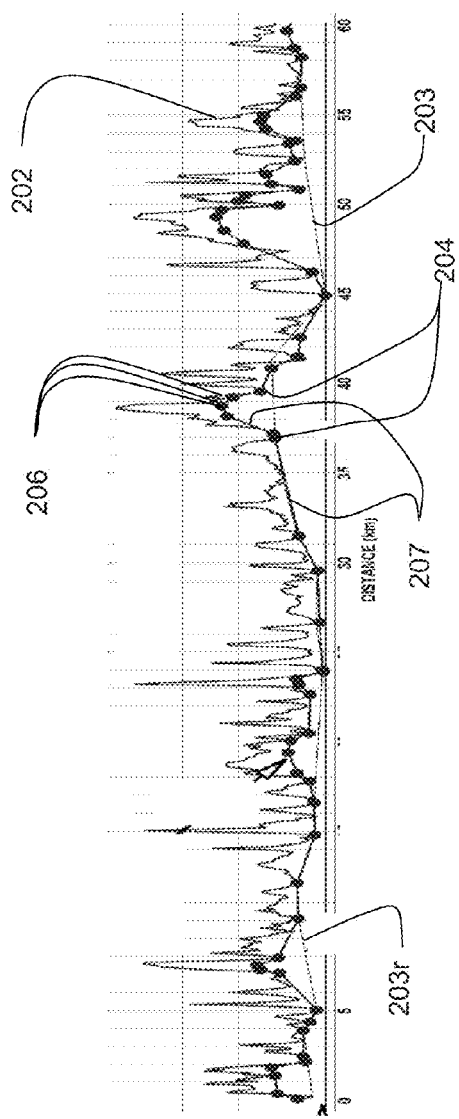

With reference to FIGS. 6E and 7E, the baseline 103, 203 for each of the two smoothed data sets 102, 202 can be further refined as a refined baseline 103r or 203r by identifying baseline vertices which were not utilized or detected in the above steps. If, between two baseline vertices 104, 204 which may or may not be consecutive vertices, several local minima 106, 206 can be identified on the signal and if a low order curve 107, 207 (e.g. polynomial, trend line, or least squares) can be visually drawn through the local minima between the two vertices 104, 204 in question, then this provides reasonably strong evidence that additional vertices should be added and/or existing vertices should be deleted. The low order curve 107 may take the form of a straight or near straight trend line, a gently undulating polynomial, or a curve that that often follows a shape similar to either an exponential decay curve or an exponential growth curve. An example of a curve that has a shape similar to an exponential growth/decay curve is that of a gamma distribution curve. The gamma distribution has a general shape that increases rapidly at the start and then gently tails off. Even if no local minima within an apparent amplitude anomaly as described above can be seen or visually connected by any type of curve, the refined baseline 103r, 203r can still be brought up into an amplitude anomaly in order to visually equalize the amplitude anomaly with the rest of the flight line so that no one amplitude anomaly is so intense that it overpowers the rest of the residual signal.

Figure 6F:
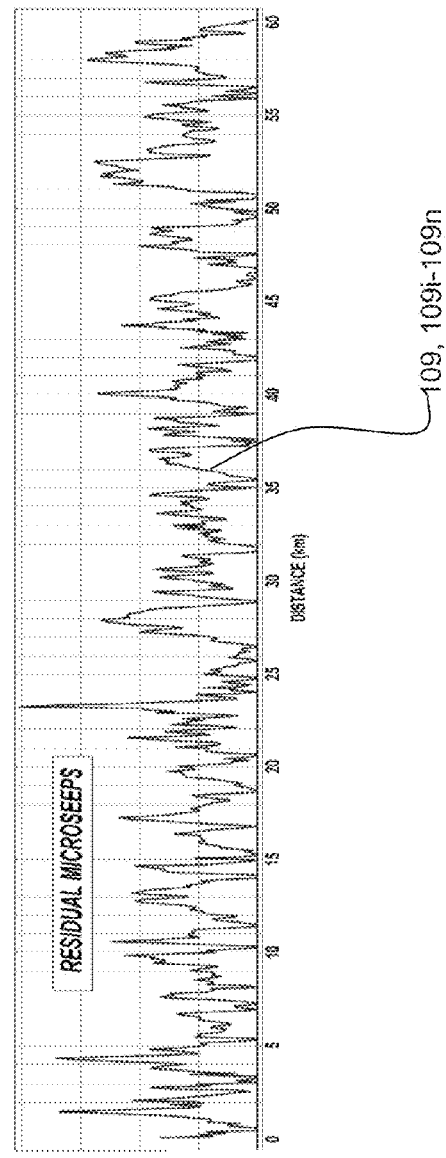
Figure 7F:
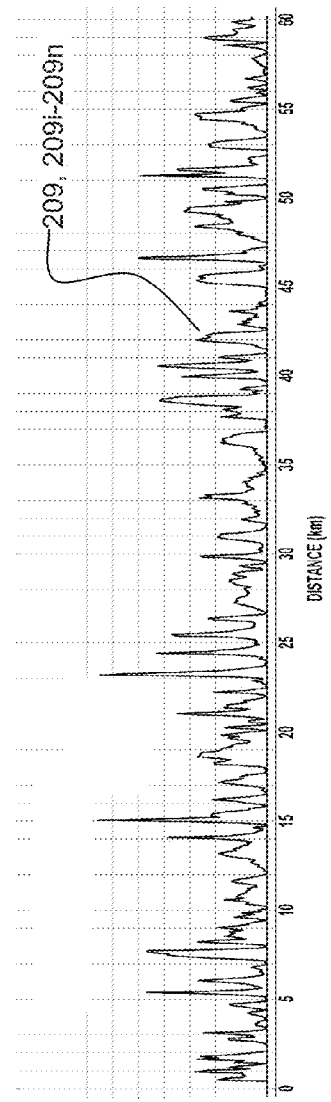

With reference to FIGS. 6F and 7F, the refined baselines 103r, 203r are subtracted from the corresponding smoothed data sets 102, 102 to arrive at a first and a second residual data set 109, 209. The first residual data set 109 comprises residual amplitude anomalies indicative of total hydrocarbon intensities and is formed of a plurality of first data points (109i-109n). As the total hydrocarbon intensities are substantially methane, each data point of the first residual data set 109i is indicative of the methane intensity for each location co-ordinate (snapshot) along a flight line. The second residual data set 209 comprises residual amplitude anomalies indicative of hydrocarbon intensities from the at least one higher order hydrocarbon raw data set and is formed of a plurality of second data points (209i-209n). Each of the second data points 209i is indicative of the at least one higher order hydrocarbon intensity for each location co-ordinate (snapshot) along a flight line.

If no refinement to the computer generated baseline is required, the residual data set for each raw data set which is indicative of the hydrocarbon intensity contained in the air samples collected for each flight line is arrived at by subtracting the computer generated baselines from the corresponding filtered raw data sets.

The residual data sets 109, 209 are normalized or averaged so that extremely intense readings do not overpower and drown out the less intense readings. One method to normalize the data is to apply a multiplying factor to each flight line such that the arithmetic mean (or some other statistical quantity) becomes the same for all flight lines. The flight line has to be of sufficient length in order for this method of normalization to be used. If the flight line is not of sufficient length then another method of normalization can be used.

Figure 8A:
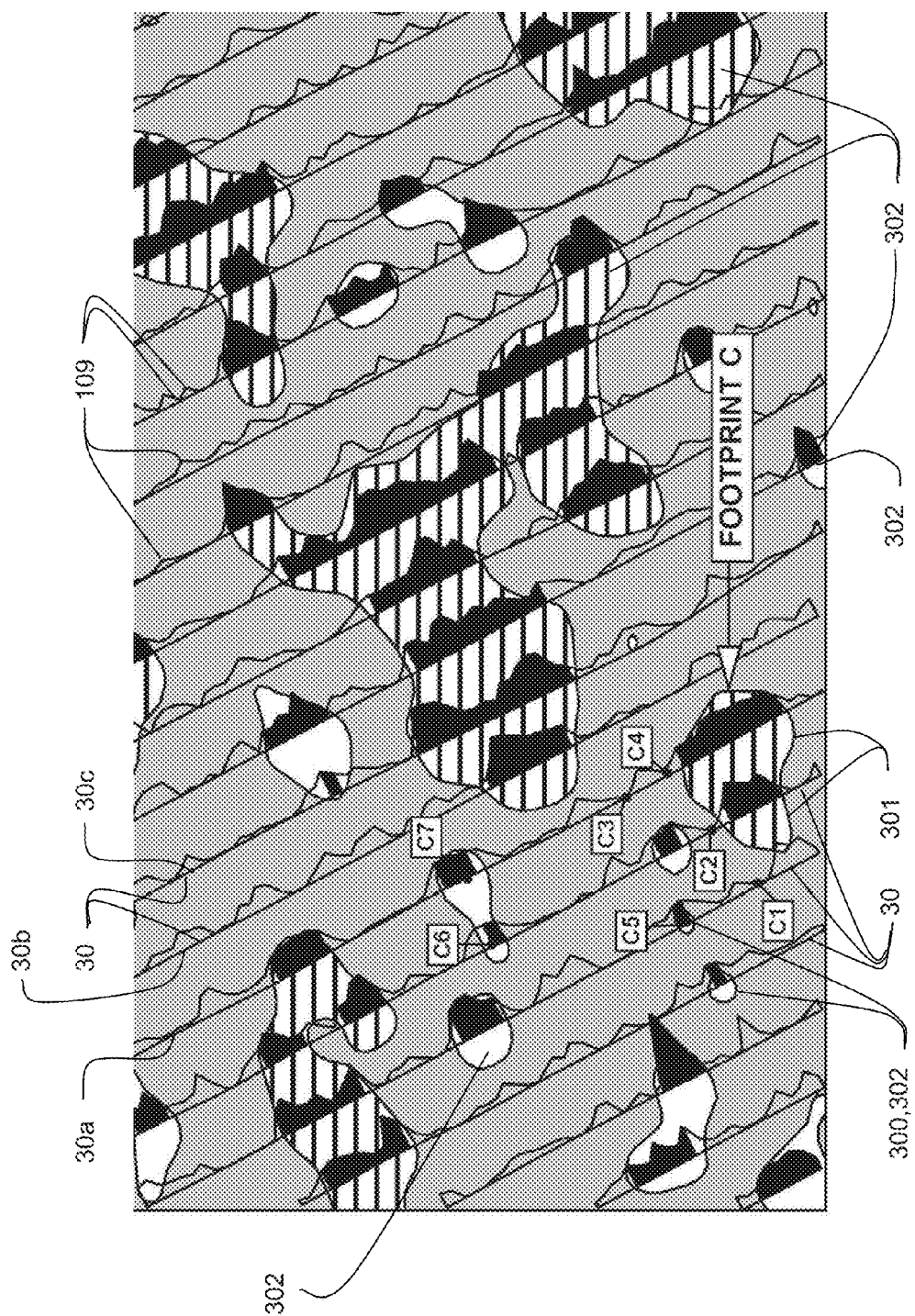
FIG. 8A is a diagrammatic representation of propane footprints created by associating equal-intensity data points of like propane intensities according to an example of the invention.

With reference to FIG. 8A, the data points (equal-intensity data points) of substantially equal magnitudes are joined to form a series (a first, first-threshold footprint and subsequent first-threshold footprint) of footprints 300.

With reference to FIG. 5B, the residual data sets 109, 209 established for all the flight lines, are mapped on the two-dimensional grid 31 formed by the flight lines 30 to show the areal distribution and intensity of the microseep signal over the entire survey area.

The residual data along a flight line 30a is substantially continuous. The data between adjacent flight lines 30a, 30b is discontinuous. The flight lines form a discontinuous two-dimensional grid 31, each flight line being associated with at least the first residual data set. A data grid or surface 301 is created by forming a more or less continuous data grid such as through a numerical interpolation of the residual data set between discontinuous and adjacent flight lines.

The data surface is created with a sufficiently small cell size in order to honor the high frequency data of the residual data sets 109, 209 but at a large enough cell size to mitigate aliasing effects. Any high frequency data and aliasing effects in the data surface that remain can be smoothed for esthetic purposes by either increasing the cell size or applying a smoothing filter to either the resulting data surface or the original raw data.

Gridding or data surface formation is performed with a small enough cell size to honor the high frequency data points in the residual data sets and a smoothing filter is used to smooth the grid to a satisfactory degree.

For example, a smoothing filter can be used such as one that drapes a Gaussian surface over a 5 cell by 5 cell window centered on a given cell and replaces the centre cell by the sum of all 25 cells multiplied by their corresponding filter element. It should be understood that other smoothing filters may also be used to achieve the desired degree of smoothing.

The gridded data surface can be displayed with a color transform and overlain on any available geological maps.

In order to identify data within the residual data set 109, 209 or gridded data surface which are deemed to be insignificant, one can establish iso-intensity functions (threshold values) on the data surface to form the footprints 300. The footprints 300 enclose areas of equal and higher intensity data points.

Figure 13:
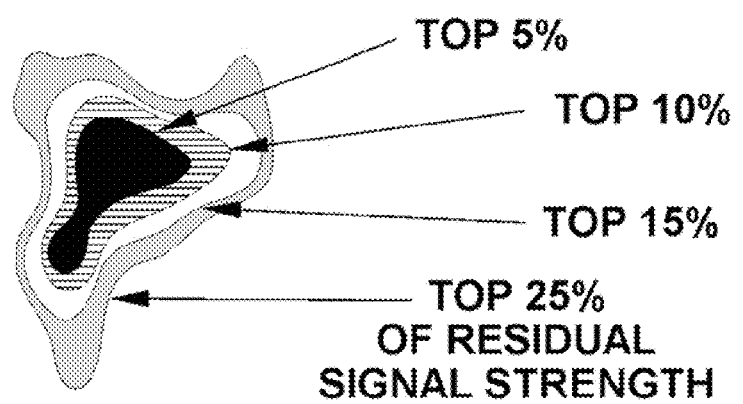
FIG. 13 is a representation of the legend associated with FIGS. 9A to 11B.

A "footprint" 300 is defined here as that portion of a given amplitude anomaly that is above a certain first-threshold hydrocarbon intensity of interest. As shown in FIG. 13, a first threshold can be commonly used is the $75^{th}$ percentile (upper quartile or top 25%), which means that microseep footprints are by definition within the high range of all microseep intensities. Even greater distinction can be set forth by determining residual data which is within higher-threshold hydrocarbon intensity such as second-threshold hydrocarbon intensity (say within a top 15%) or a third-threshold (within a top 10%) or a fourth-threshold intensity (within a top 5%). A first-threshold footprint, second-threshold footprint and higher-threshold footprints, resulting from the first, second and higher-threshold hydrocarbon intensities, form a stacked footprint for further illustrating the potential of the subsurface formation beneath the footprint.

Figure 8B:
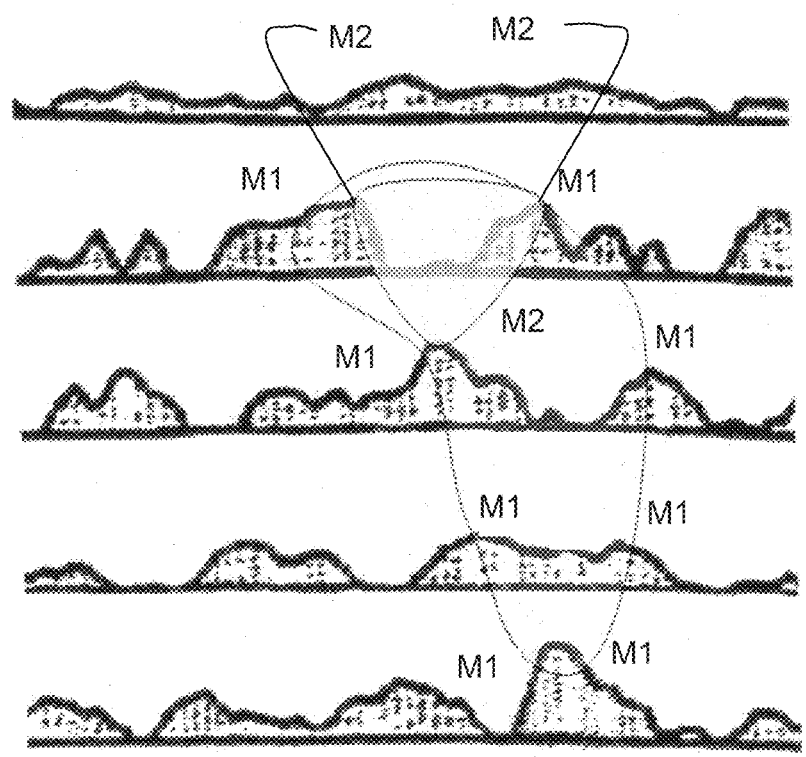
FIG. 8B is an exploded view of one propane footprint of FIG. 8A.

With reference to FIG. 8B, a footprint is created by first identifying data points, relatably adjacent one another within the data surface and having intensities M1, M2, magnitude of which are equal to a selected threshold value of interest (M1—a first-threshold value and M2—a second-threshold value) and associating such data points to create a footprint 300. The footprint 300 is indicative of the location, size, shape and orientation of the subsurface formation.

The gridded data surface, residual data sets 109, 209 and footprints 300 may also be checked for the general consistency of the amplitude anomalies over a large area. No single anomaly should be so intense that it overpowers the other anomalies in the area. Footprints 300 should not be oriented parallel or near parallel to a flight line or have unusually sharp or pointed edges to them. Such amplitude anomalies should be re-examined (i.e. the residual data sets should be checked) to see if the baseline contains an incorrect vertex and if so, the baseline should be modified.

Successive flight lines 30 are also inspected for any potential line-by-line correlation. If it can be determined that adding or deleting one or more baseline vertices 104 may give better line by line correlation, then this can be taken as evidence the baseline 103 should be adjusted.

Figure 8C:
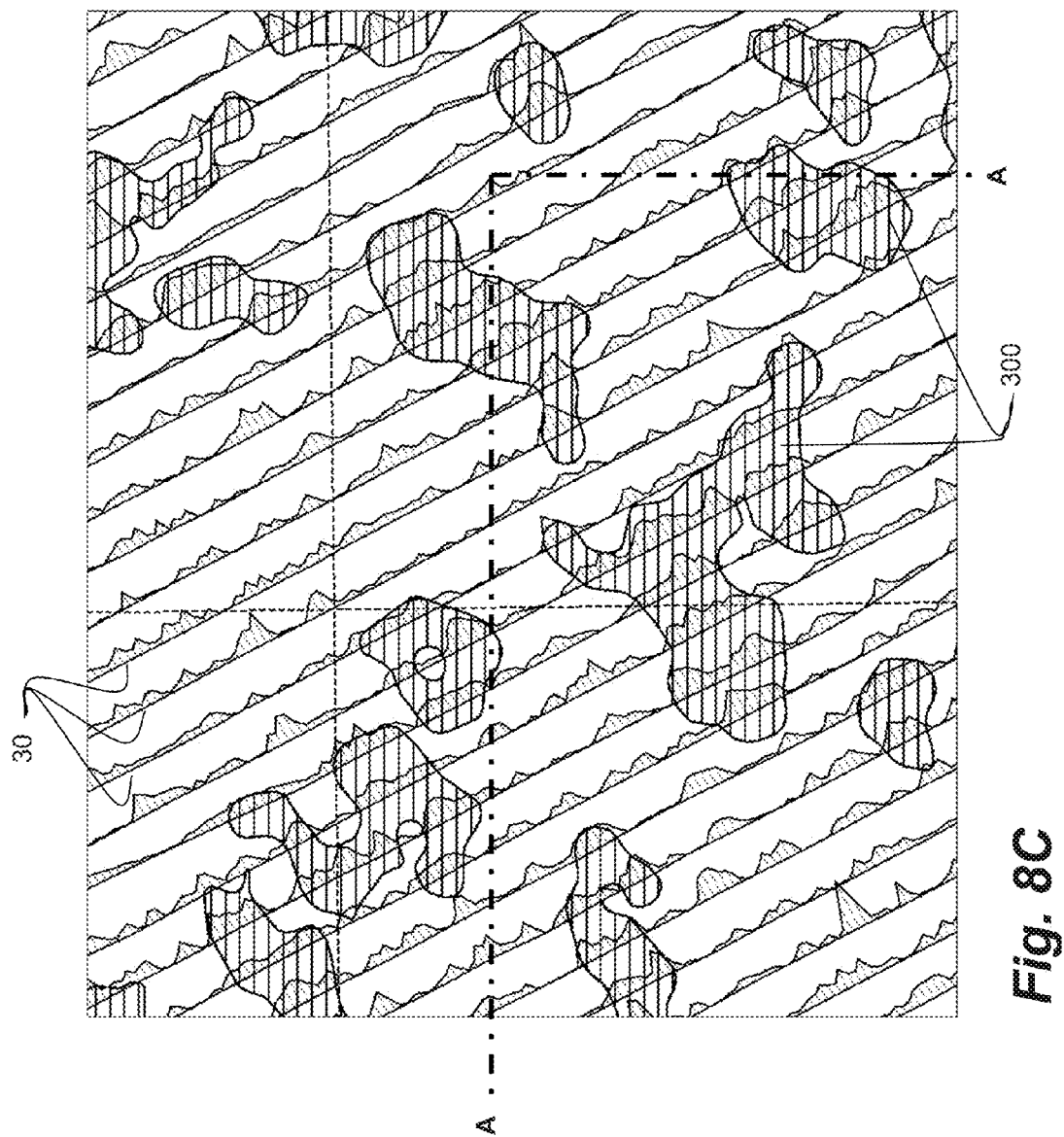
FIG. 8C is a diagrammatic representation of those propane footprints which fall above the threshold areal extent selected according to an example of the invention.

Comparing FIGS. 8A and 8C, insignificant footprints 302 can be further identified and separated by establishing an areal-extent threshold. For example, an areal-extent threshold established could be 2 square kilometers. Only those footprints 300 equal or greater than the established areal-extent threshold (greater than 2 square kilometers) would be would be overlain on the geological map. FIG. 8C shows only those footprints 300 which are greater than 2 square kilometers. Footprints 302 in FIG. 8A are not shown in FIG. 8C as these footprints are less than 2 square kilometers. Any other criteria for separation other than areal extent can be applied.

Figure 12:
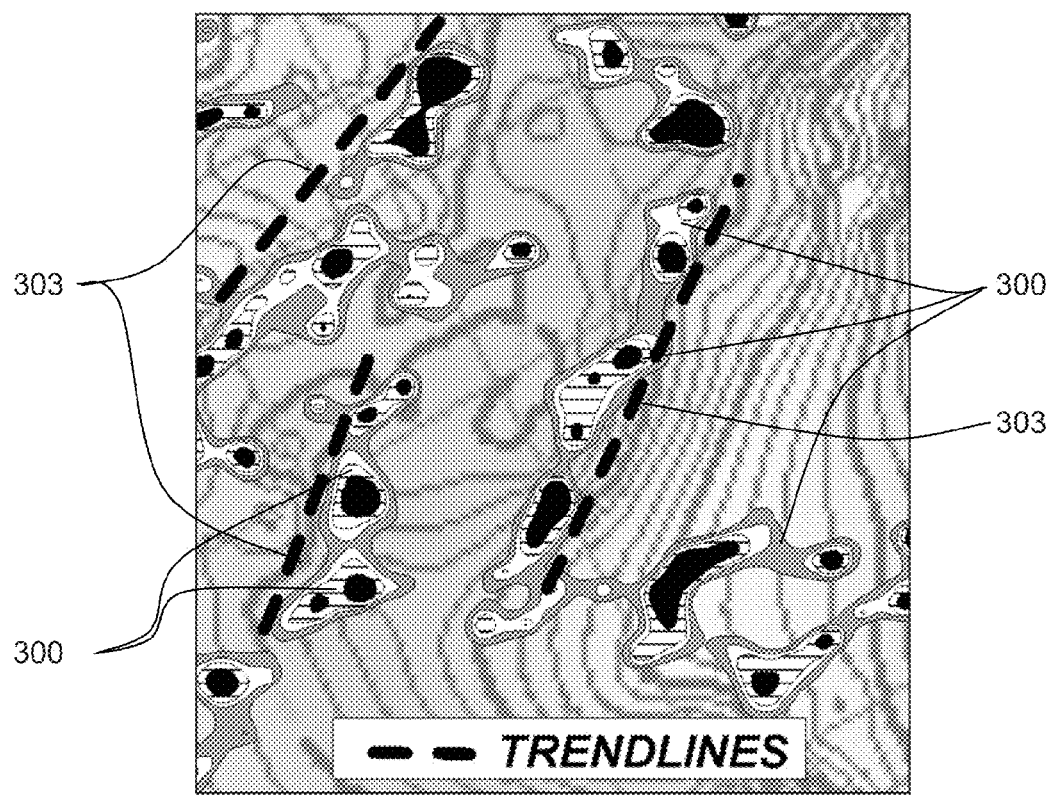
FIG. 12 is a representation of the higher order hydrocarbon footprints superimposed on another section of the geological map of the terrain which was surveyed showing the general orientation of the footprints.
Figure 14:
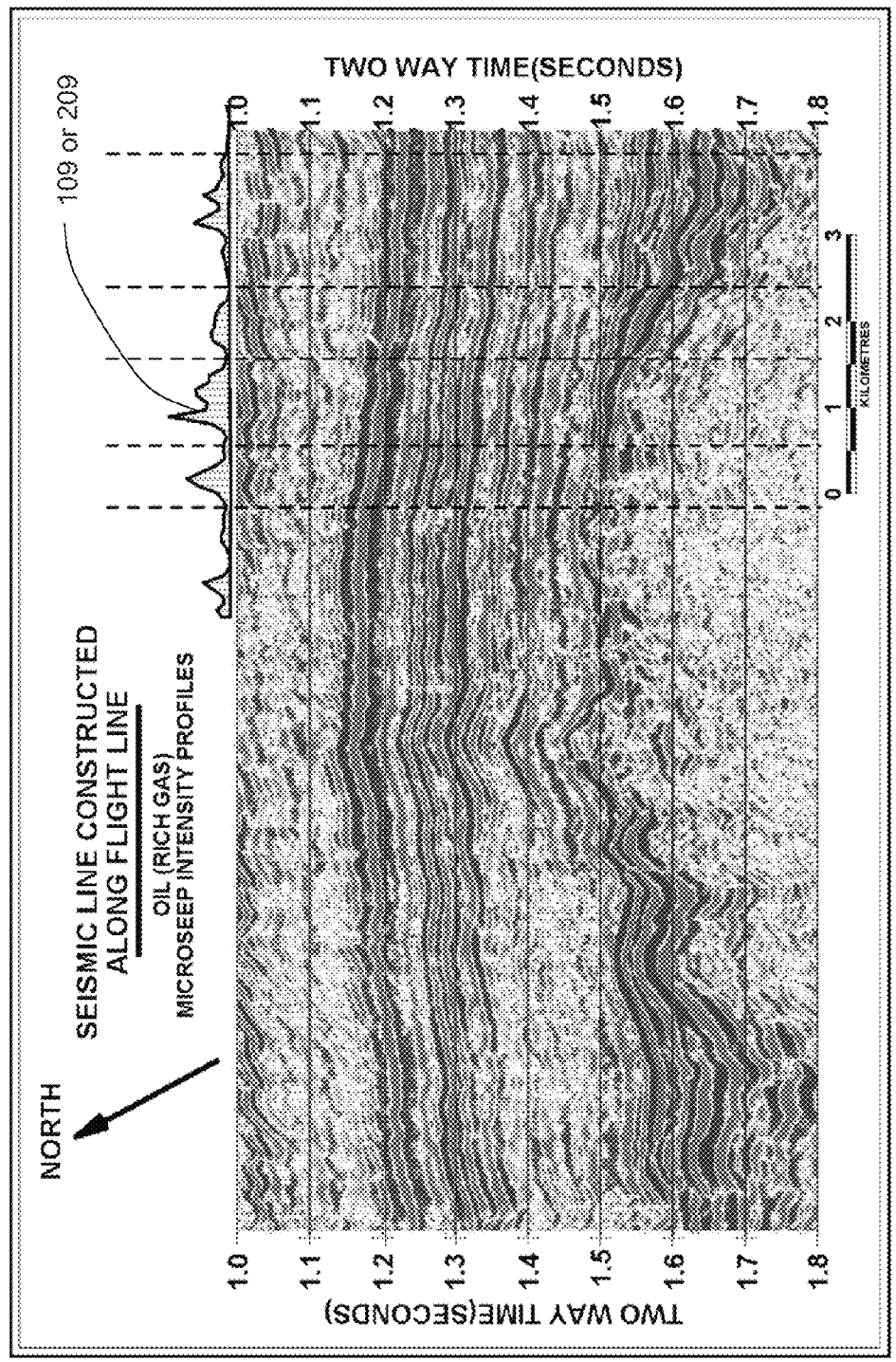
FIG. 14 is a representation where the commercially viable higher hydrocarbon intensities (propane intensity profile) for one flight line is coupled with the seismic data collected from a 3-D seismic survey of the geological area where the commercially viable propane footprints are located according to an example of the invention.

Applicant notes that the spatial patterns of microseep footprints often provide evidence of the migration paths of hydrocarbons moving updip from the deep kitchen areas of the basin, into either structural closures, or into stratigraphic trapping conditions where further migration of oil or gas is halted by changes in the geological facies, such as a porous and permeable reservoir rock being in contact with laterally updip, low permeability lithology which terminates the further movement of hydrocarbons; thus creating a stratigraphic oil or gas pool without any four-way dip structural closure. These types of oil and gas pools are often very difficult to image or resolve with two-dimensional (2-D) seismic mapping. If the microseep footprint is sufficiently large in areal extent, suggesting possible commercial viability, a three-dimensional (3-D) seismic survey could be undertaken and centered over the microseep footprint. Knowing where the trapped pool is located in plan view allows detailed scrutiny of the 3-D seismic dataset to accurately predict the geological zone of interest, as well as its approximate depth. If a successful oil or gas well was located and drilled within the footprint, then the newly discovered pool or field could be the benchmark example of a new exploration play-type in that particular sedimentary basin. Because the microseep surveys are often large in areal extent, a trend or series of similar footprints may also be considered to be prospective. A trend line can be drawn along the footprints to indicate possible migration pathways, barriers to migration or other lithological or geological trends. FIG. 12 illustrates trend lines 303 drawn along footprints superimposed on the geological map of the subsurface formation. Trend lines need not be straight lines. A meandering trend line indicates meandering channel facies or a migration pathway that does not follow a straight or nearly straight line. If the newly discovered oil or gas pool happens to fall within a microseep footprint which appears to be associated with a series of similar undrilled microseep anomalies, it would be reasonable to assume that additional latent petroleum and natural gas pools could be found by expanding the scope of 3-D seismic coverage over the microseep footprint "trend" with a reasonable expectation that more new pools may be discovered in the same geological horizon as the first discovery. The additional 3-D seismic data would again be coupled with footprints in future drill site selection. Neither the microseep footprints nor the seismic dataset are sufficient, in isolation, to locate the trap with certainty, but both independent information layers combined can greatly improve the drilling success rate. FIG. 14 illustrates the coupling of commercially viable methane residual data (109 or 209) with seismic data.

The least one data processing unit 6 (FIG. 1) carries out the steps of establishing the at least first residual data set; mapping the at least first residual data set on the two-dimensional grid; establishing the at least first-threshold hydrocarbon intensity of interest; forming the at least a first, first-threshold footprint; and superimposing the at least a first, first-threshold footprint over a geological map of the subsurface formation within the terrain surveyed to readily identify at least the location, size and shape of the terrain corresponding to the subsurface formation of interest. Herein, the term "superposition" means relating footprints or residual data sets with the geological features of the subsurface formation. One form of superposition is to map the footprints on the geological map of the subsurface formation The processing unit 6 can comprise means for shifting the at least one raw data set 100, 200 by a specified lag; means for removing noise from the shifted at least one raw data set using filters; means for generating a baseline 103, 203 for the filtered at least one raw data to obtain residual amplitude anomalies; means for subtracting the generated baseline from the filtered raw data set to arrive at a least one residual data set 109, 209 containing residual amplitude anomalies indicative of the hydrocarbon intensities contained in the collected air samples. The processing unit further comprises means for establishing the at least first-threshold hydrocarbon intensity of interest; means for forming the at least a first, first-threshold footprint; and means for superimposing the at least a first, first-threshold footprint over a geological map of the subsurface formation within the terrain surveyed to readily identify at least the location, size and shape of the terrain corresponding to the subsurface formation of interest.

Example 1

A survey was conducted in South Australia. The results are shown in FIGS. 9A-13. The aircraft 15 used was a twin engine, low wing Piper Navajo. The scoop 2 was located on the top of the fuselage of the aircraft forward of the engine. The aircraft was flown 100 meters above the terrain. The line spacing between the flight lines was 1 km. A section of the flight plan (two-dimensional grid) is illustrated in FIG. 5A of the accompanying drawings. The average flight parameters were as follows:

Speed of the aircraft 282.0 km/hr
Wind speed 20.5 km/hr
Ground speed 280.5 km/hr
Total flying time 9 hr 58 min The air samples were collected by the scoop illustrated by FIGS. 2A, 2B and 2C of the accompanying drawings and the amount of methane ions and propane ions were detected by the detectors at 1 second intervals. A DCD detector was used to detect the methane ions. A photoionisation detector was used to detect the propane ions. The total number of hydrocarbon ions detected in the collected air samples for each interval along a flight line by the first detector (DCD) (which are essentially methane ions) was associated with location co-ordinates to form the first raw data set. The propane ions detected in the collected air samples by the second detector (PID) for each interval along a flight line was associated with location co-ordinates to form the second raw data set. The GPS navigation system used was a Novatel OEM3 Millenium GPSCard. The first set and second set of raw data and the flight parameters were analyzed further by a processing unit to arrive at first and second residual data sets which correspond to methane and propane intensities.

Schematic representations of the data analysis (isolation of residual amplitude anomalies) steps for methane and propane ions are shown in FIGS. 6A through 6F and 7A through 7F, respectively of the accompanying drawings. The steps involved in the analysis were as follows:

With reference to FIGS. 6A and 7A for the first and second raw data sets 100, 200 respectively, the start fiducials were shifted by 3 seconds.

With reference to FIGS. 6B and 7B, the two raw data sets were resampled. The resampling interval was chosen to be 80 meters. This was calculated by taking the average speed of the aircraft over several flight lines.

With reference to FIGS. 6C and 7C, the two resampled data sets 101, 201 were passed through filters to get rid of noise. The filter used for the noise reduction was a normal distribution filter.

With reference to FIGS. 6D and 7D, a computer generated baseline 103, 203 was generated for each of the filtered (smoothed) data sets 102, 202. This was generated by identifying vertices 104, 204 separating individual amplitude anomalies and joining the identified vertices. The algorithm used for generation of the baseline has been defined in the description.

With reference to FIGS. 6E and 7E, the above baselines 103, 203 were inspected to check vertices that the computer generated baseline either incorrectly identified or failed to detect. The vertices were then joined together by straight lines resulting in a refined baseline 103r, 203r for each data set.

With reference to FIGS. 6F and 7F, the refined baselines 103r, 203r were subtracted from the filtered raw data sets (refer step 3) to arrive at a residual data set 109, 209 corresponding to each of the two original raw data sets, which are indicative of the methane and propane microseep intensities (residual amplitude anomalies) contained in the collected air samples.

With reference to FIG. 5B, the first and second residual data sets established for all the flight lines 30 are mapped on the discontinuous two-dimensional grid 31 formed by the flight lines to show the areal distribution and intensity of the microseep signal over the entire survey area.

The data surface was mapped and checked for consistency as well as any baselining errors before proceeding.

Footprints were formed by establishing a first-threshold value, second-threshold value, third-threshold value and fourth-threshold value. The first, second, third and fourth threshold values chosen were top 25%, top 15%, top 10% and top 5% of the hydrocarbon intensities represented by the residual data sets, respectively. Examples of first through fourth-threshold values are shown in FIGS. 9A-10B and a legend is shown in FIG. 13.

Figure 9A:
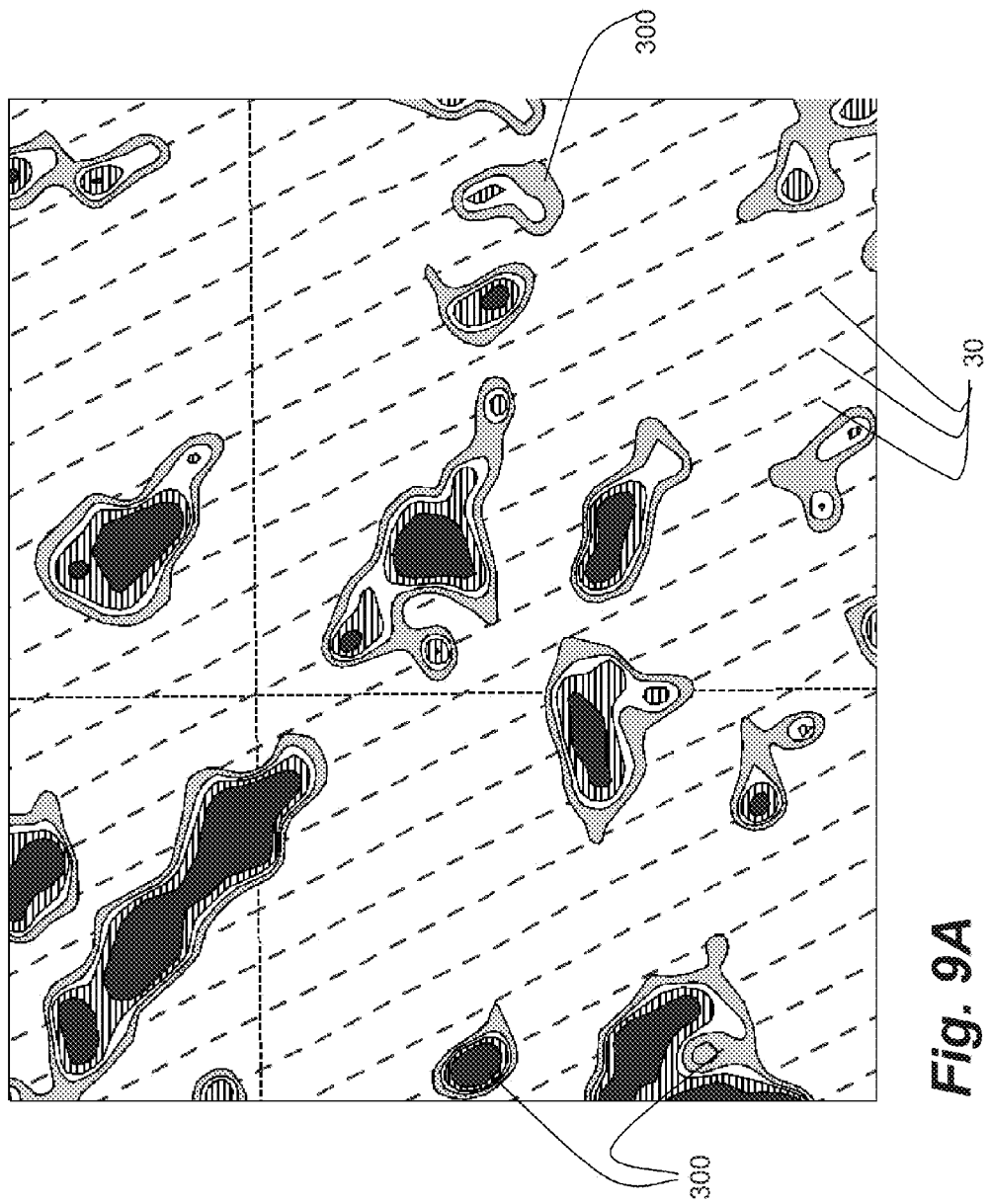
FIG. 9A is a representation of the methane footprints associated with the corresponding methane intensities and superimposed on the section of the survey flight plan illustrated in FIG. 5A according to an example of the invention.
Figure 9B:
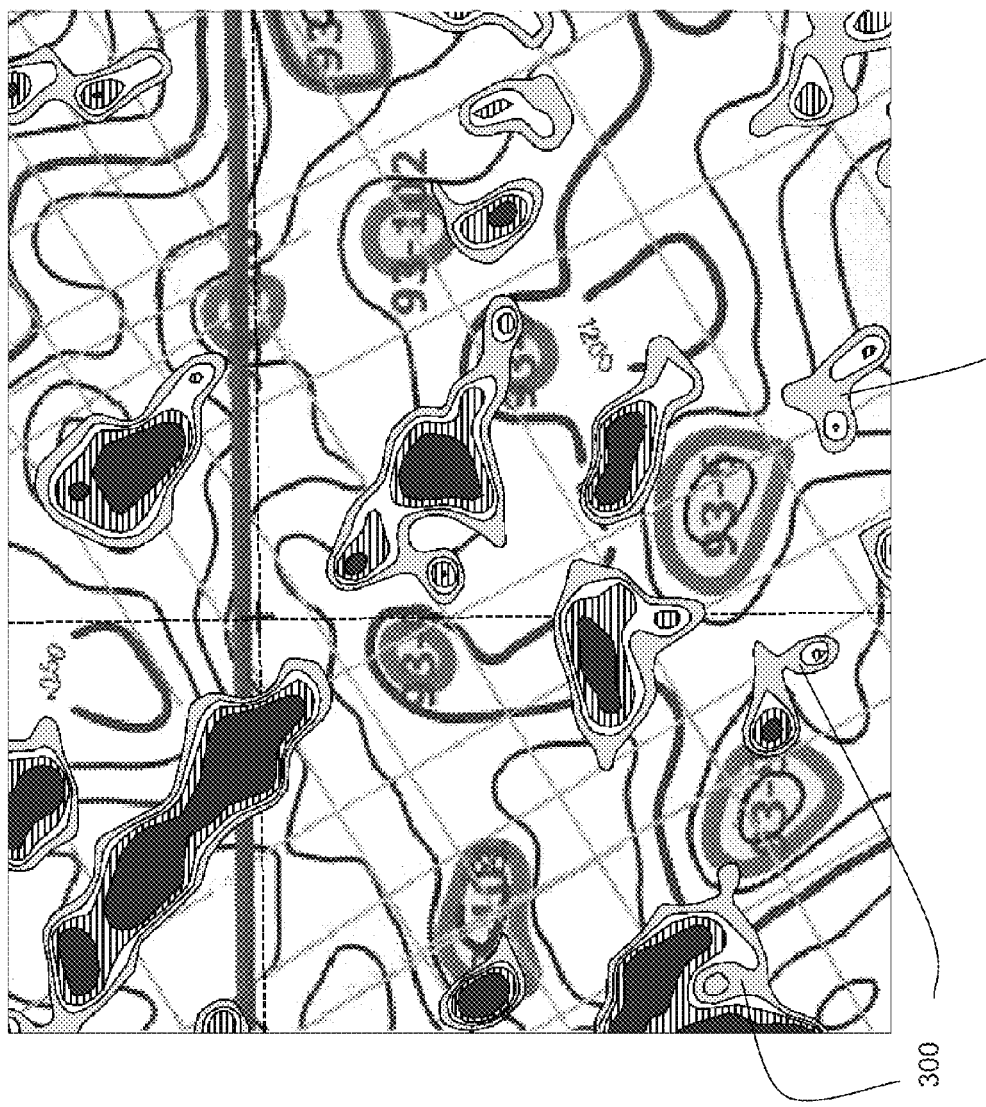
FIG. 9B is a representation of the methane footprints superimposed on the section of the geological map illustrated in FIG. 4 according to an example of the invention.

Data points (equal-intensity data points) in the two-dimensional grid, relatably adjacent one another and having intensities equal to the specified threshold values were identified and associated to form methane footprints and propane footprints. An example for formation of footprints for one threshold value is illustrated in FIGS. 8A and 8B. FIG. 9A illustrates footprints formed for four different threshold values.

Footprints corresponding to the methane and propane intensities were mapped on the same section of the flight plan illustrated in FIG. 5A or on separate sections for clarity.

With reference to FIG. 9A, the footprints for methane are illustrated superimposed on the flight plan of FIG. 5A. Then, with reference to FIG. 9B, the methane footprints were also superimposed on the geological map of the subsurface formation within the area surveyed. Each methane footprint is represented by a stacked footprint representing the first-threshold footprint, second-threshold footprint, third-threshold footprint and fourth-threshold footprint, more specifically as shown in the legend of FIG. 13.

Figure 10A:
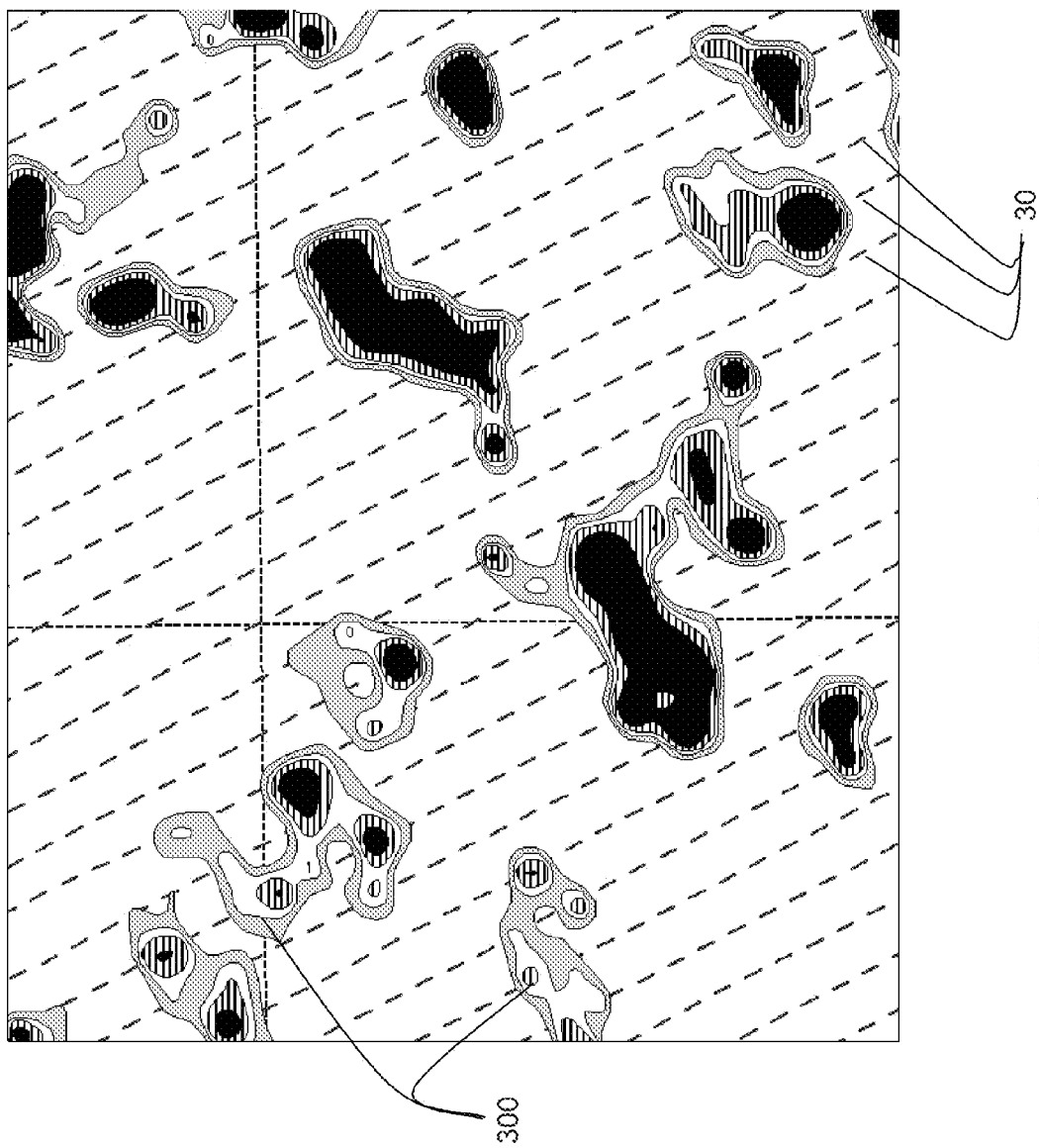
FIG. 10A is a representation of the higher order hydrocarbon footprints associated with the corresponding higher order hydrocarbon intensities and superimposed (propane footprints are superimposed in the example) on the section of the survey flight plan illustrated in FIG. 5A according to an example of the invention.
Figure 10B:
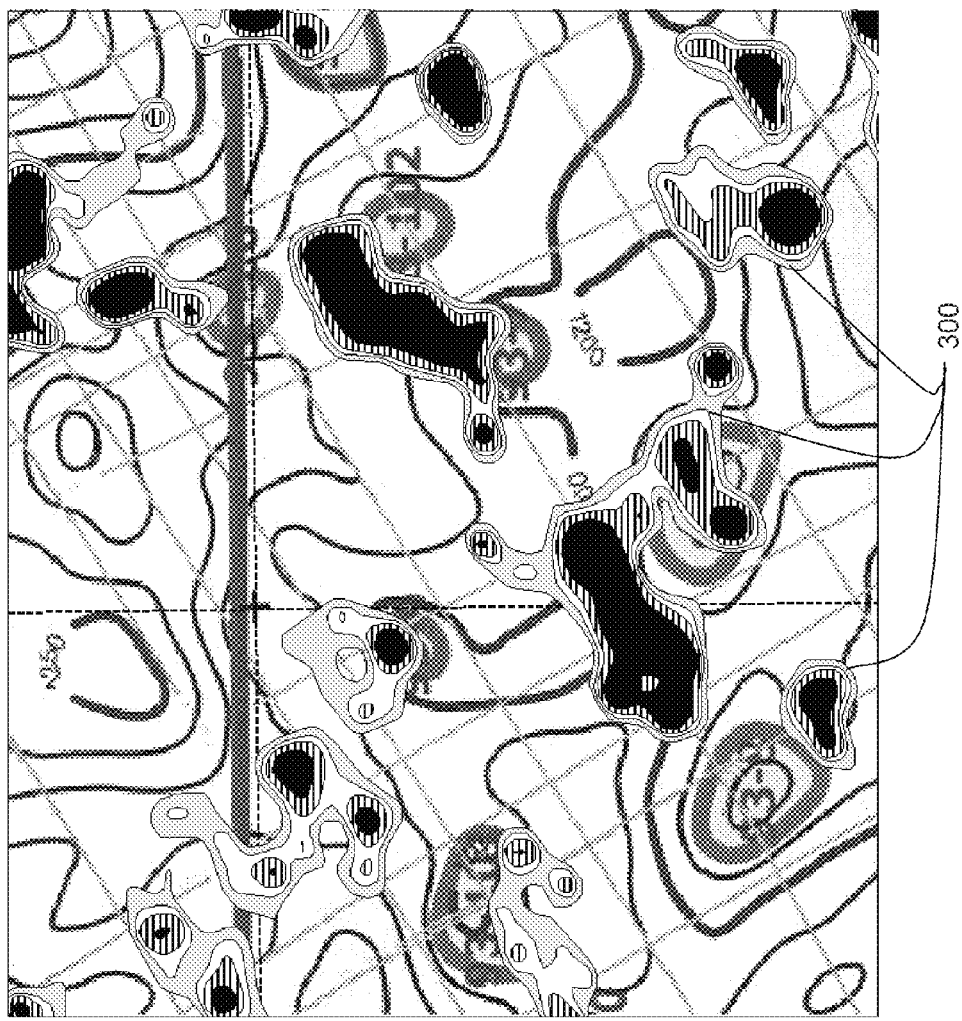
FIG. 10B is a representation of the higher order hydrocarbon footprints superimposed (propane footprints are superimposed in the example) on the section of the geological map illustrated in FIG. 4 according to an example of the invention.

Similarly, with reference to FIGS. 10A and 10B, respectively, the propane footprints are superimposed on the flight plan of FIG. 5A and superimposed on the geological map of the subsurface formation.

The following parameters were easily identified from the superimposed geological maps: location of the detected subsurface reservoirs; type of the subsurface reservoirs; size, shape and orientation of the subsurface reservoir; and prospectivity of the subsurface reservoir according to the defined thresholds.

No further analysis is required for the identification of the above stated parameters.

A 3-D seismic survey of the area, where the commercially exploitable hydrocarbon footprints were located, and the 3-D seismic dataset were scrutinized to accurately predict the geological zone of interest as well as its approximate depth. FIG. 14 is a representation where the propane intensities for one flight line are coupled with the seismic data collected from a 3-D seismic survey of the geological area where the commercially viable propane footprints are located.

Example 2

Figure 11A:
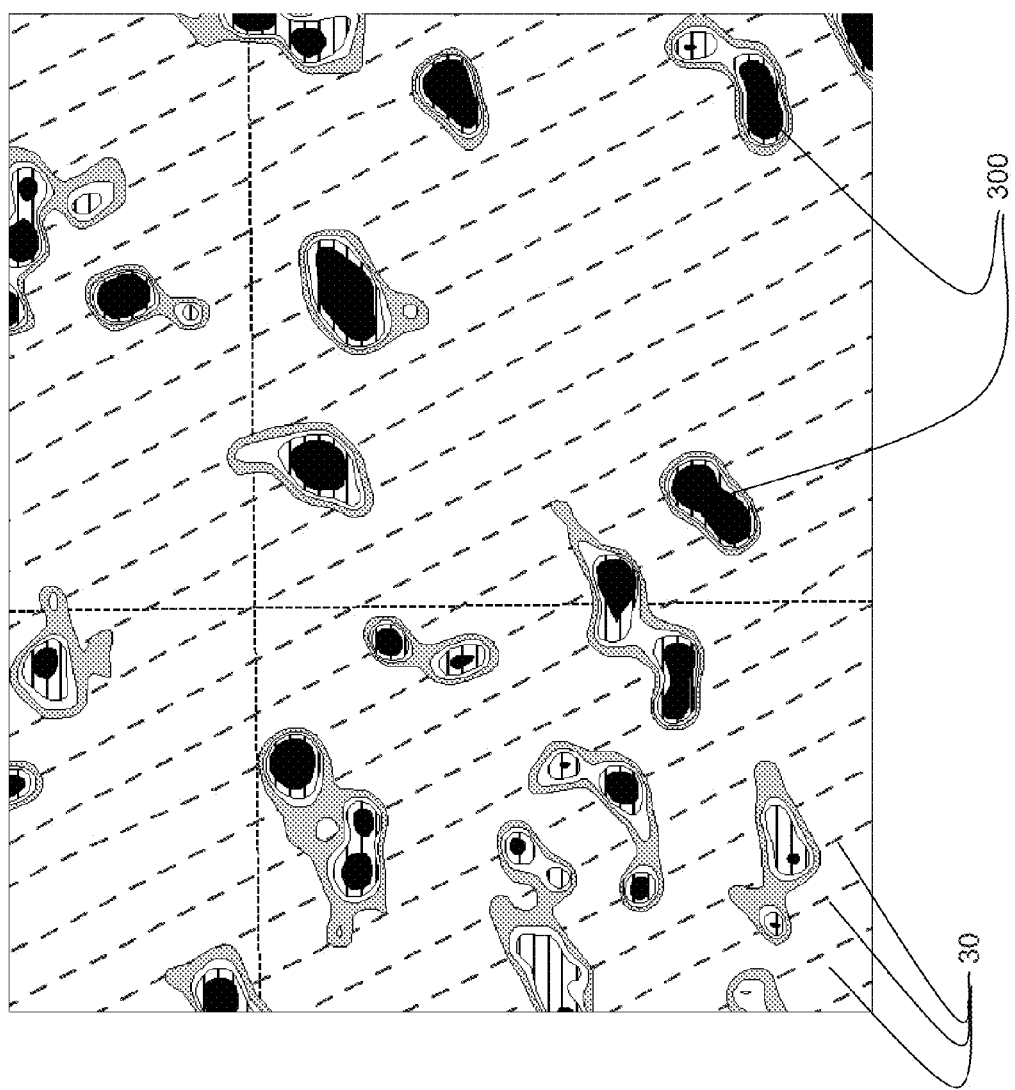
FIG. 11A is a representation of the higher order hydrocarbon footprints associated with the corresponding higher order hydrocarbon intensities and superimposed (pentane footprints are superimposed in the example) on the section of the survey flight plan illustrated in FIG. 5A according to another example of the invention.
Figure 11B:
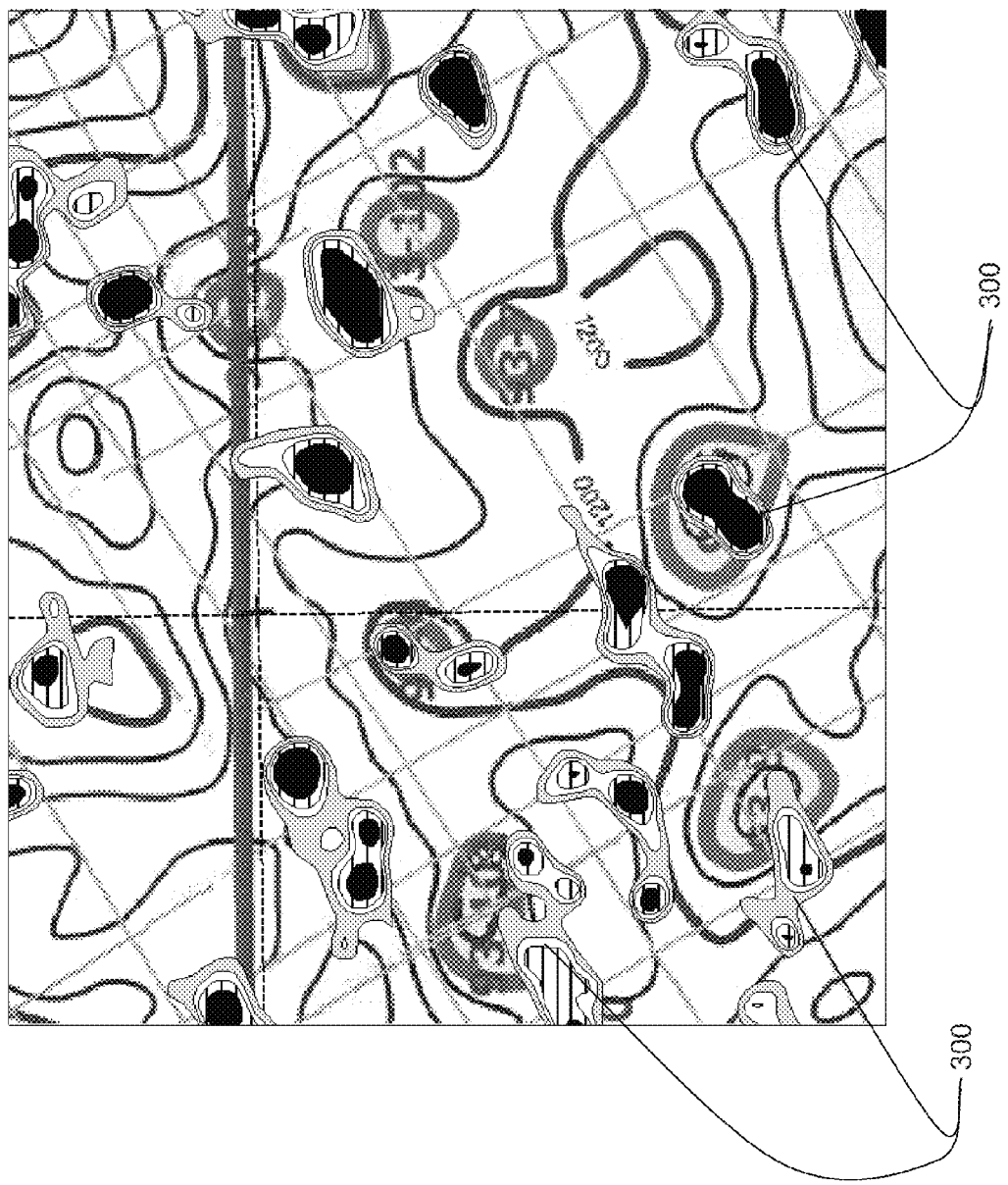
FIG. 11B is a representation of the higher order hydrocarbon footprints superimposed (pentane footprints are superimposed in the example) on the section of the geological map illustrated in FIG. 4 according to another example of the invention.

The same steps described in Example 1 were repeated except that the one of the higher order hydrocarbon ions, in addition to propane ions, was detected using a third detector. The third detector used was a photoionisation detector and it was used to detect pentane ions. The data was analyzed to obtain pentane footprints. With reference to FIGS. 11A and 11B, respectively, the pentane footprints are superimposed on the flight plan of FIG. 5A and superimposed on the geological map of the subsurface formation.

According to another embodiment of the invention the detector array detects either methane ions or at least one higher order hydrocarbon ions.

The higher order hydrocarbons present in the collected air samples are propane or butane or pentane or hexane or mixtures thereof.

The embodiments of the invention in which an exclusive property or privilege is claimed are defined as follows:

1. A method for the detection and categorization of hydrocarbon deposits in subsurface formations comprising:
   traversing a plurality of flight lines over terrain to be surveyed for establishing a two-dimensional grid over the terrain which corresponds to the subsurface formations therebelow;
   collecting air samples along the flight lines;
   counting hydrocarbon ions present in the collected air samples for each of a plurality of location co-ordinates along the flight lines for establishing at least one raw data set of the hydrocarbon ion count at each of the plurality of location co-ordinates;
   isolating amplitude anomalies from the at least one raw data set for establishing at least a first residual data set of data points, each data point being indicative of the hydrocarbon intensity at each of the plurality of location co-ordinates in the two-dimensional grid; and
   using at least one data processing unit,
      mapping the at least first residual data set on the two-dimensional grid;
      establishing at least a first-threshold hydrocarbon intensity;
      identifying data points relatably adjacent one another within the two-dimensional grid and having intensities equal to the first-threshold hydrocarbon intensity;
      associating such equal-intensity data points to form at least a first, first-threshold footprint which encompasses the equal-intensity data points and any greater-intensity data points having intensities greater than the first-threshold hydrocarbon intensity; and
      superimposing the at least a first, first-threshold footprint over a geological map of the subsurface formation within the terrain surveyed to readily identify at least the location, size and shape of the hydrocarbon deposits in the subsurface formation beneath the first, first-threshold footprint.

2. The method of claim 1 further comprising:
   forming at least a subsequent first-threshold footprint by associating equal-intensity data points relatably adjacent one another within the two-dimensional grid and having intensities equal to the first-threshold hydrocarbon intensity; and
   superimposing the at least a subsequent first-threshold footprint over a geological map of the subsurface formation within the terrain surveyed to readily identify at least the location, size and shape of the hydrocarbon deposits in the subsurface formation beneath the subsequent first-threshold footprint.

3. The method of claim 1 further comprising:
   establishing at least a second-threshold hydrocarbon intensity, the second-threshold hydrocarbon intensity being higher than the first-threshold hydrocarbon intensity;
   identifying equal intensity data points relatably adjacent one another within the two-dimensional grid and having intensities equal to the second-threshold hydrocarbon intensity; and
   associating such data points to form at least a first, second-threshold footprint which encompasses data points having intensities equal to the second-threshold hydrocarbon intensity or data points having intensities greater than the second-threshold hydrocarbon intensity.

4. The method of claim 3 further comprising:
   forming at least a subsequent second-threshold footprint; and
   superimposing the at least a subsequent second-threshold footprint over a geological map of the subsurface formation within the terrain surveyed to readily identify at least the location, size and shape of the hydrocarbon deposits in the subsurface formation beneath the subsequent second-threshold footprint.

5. The method of claim 3 further comprising:
   superimposing the least a first, first-threshold footprint and the least a first, second-threshold footprint over a geological map of the subsurface formation to form at least a first stacked footprint wherein the least a first, second-threshold footprint lies within the least a first, first-threshold footprint to readily identify at least the location, size and shape of the hydrocarbon deposits in the subsurface formation beneath the stacked footprint.

6. The method of claim 3 further comprising:
   establishing at least a first-threshold areal extent for the at least a first, first-threshold footprint and the at least a first, second-threshold footprint; and
   superimposing only those first-threshold footprints and second-threshold footprints at or above the at least first threshold areal extent over a geological map of the subsurface formation within the terrain surveyed to readily identify at least the location, size and shape of the hydrocarbon deposits in the subsurface formation beneath the first-threshold footprints and second-threshold footprints.

7. The method of claim 1 wherein the counting of the hydrocarbon ions comprises counting substantially methane ions.

8. The method of claim 7 wherein the methane ions are counted using a direct current discharge spectral emission type detector.

9. The method of claim 7 wherein the at least one raw data set of hydrocarbon ion count corresponds to the count of methane ions.

10. The method of claim 1 wherein the counting of the hydrocarbon ions comprises counting at least one higher order hydrocarbon ions.

11. The method of claim 10 wherein the at least one higher order hydrocarbon ions are counted using a photoionization detector.

12. The method of claim 10 wherein the at least one higher order hydrocarbons are propane.

13. The method of claim 10 wherein the at least one raw data set of hydrocarbon ion count corresponds to the count of the at least one higher order hydrocarbon ions.

14. The method of claim 10 wherein the counting of the hydrocarbon ions further comprises counting a second higher order hydrocarbon ions.

15. The method of claim 14 wherein the second higher order hydrocarbons are pentane.

16. The method of claim 1 wherein the counting of the hydrocarbon ions comprises counting methane ions and at least one higher order hydrocarbon ions.

17. The method of claim 16 wherein the at least one raw data set of hydrocarbon ion count comprises a first data set corresponding to the count of the methane ions and a second raw data set corresponding to the count of the at least one higher order hydrocarbon ions.

18. The method of claim 17 wherein the at least one higher order hydrocarbons are propane or butane or pentane or hexane or mixtures thereof.

19. The method of claim 1 wherein the air samples are collected by traversing the terrain in an aircraft flown about 0.1 km above the terrain.

20. The method of claim 1 wherein maximum distance between the flight lines is in the range of about one half to above one kilometer.

21. The method of claim 20 wherein the maximum distance between the flight lines is about one kilometer.

22. The method of claim 1 wherein the collected air samples are associated with location co-ordinates using a GPS navigating system.

23. The method of claim 1 wherein
establishing the at least first residual data set;
mapping the at least first residual data set on the two-dimensional grid;
establishing the at least first-threshold hydrocarbon intensity of interest;
forming the at least a first, first-threshold footprint; and
superimposing the at least a first, first-threshold footprint over a geological map of the subsurface formation within the terrain surveyed to readily identify at least the location, size and shape of the hydrocarbon deposits in the subsurface formation beneath the first, first-threshold footprint is carried out by the at least one data processing unit.

24. The method of claim 1 wherein establishing the at least a first residual data set comprises:
shifting the at least one raw data set by a specified lag;
removing noise from the at least one raw data set using filters;
generating a baseline for the at least one raw data to isolate residual amplitude anomalies;
and subtracting the generated baseline from the filtered at least one raw data set to arrive at the at least one residual data set; wherein the at least one residual data set contains residual amplitude anomalies indicative of the hydrocarbon intensities.

25. The method of claim 24 wherein the specified lag is in the range of non-zero seconds to about 6 seconds.

26. The method of claim 24 wherein the specified lag is 0 seconds.

27. The method of claim 1 further comprising counting of carbon dioxide ions or iodine ions.

* * * * *